United States Patent
Kwon et al.

(10) Patent No.: US 8,886,861 B2
(45) Date of Patent: Nov. 11, 2014

(54) MEMORY INTERLEAVING DEVICE TO RE-ORDER MESSAGES FROM SLAVE IPS AND A METHOD OF USING A REORDER BUFFER TO RE-ORDER MESSAGES FROM SLAVE IPS

(75) Inventors: Woo Cheol Kwon, Suwon-si (KR); Jae Geun Yun, Hwaseong-si (KR); Sung-Min Hong, Hwaseong-si (KR)

(73) Assignee: Samsung Electronics Co., Ltd., Suwon-Si, Gyeonggi-Do (KR)

( * ) Notice: Subject to any disclaimer, the term of this patent is extended or adjusted under 35 U.S.C. 154(b) by 300 days.

(21) Appl. No.: 13/323,162

(22) Filed: Dec. 12, 2011

(65) Prior Publication Data
US 2012/0159037 A1 Jun. 21, 2012

(30) Foreign Application Priority Data
Dec. 17, 2010 (KR) .......... 10-2010-0130329

(51) Int. Cl.
*G06F 13/00* (2006.01)
*G06F 13/40* (2006.01)
*G06F 13/364* (2006.01)

(52) U.S. Cl.
CPC .......... *G06F 13/4022* (2013.01); *G06F 13/364* (2013.01)
USPC .......................................... 710/110; 710/317

(58) Field of Classification Search
USPC .................. 710/104–119, 305–317
See application file for complete search history.

(56) References Cited

U.S. PATENT DOCUMENTS

| | | | | |
|---|---|---|---|---|
| 6,834,314 | B1 * | 12/2004 | Askar | 710/5 |
| 7,143,221 | B2 * | 11/2006 | Bruce et al. | 710/113 |
| 7,161,901 | B2 * | 1/2007 | Vu | 370/229 |
| 7,162,546 | B2 * | 1/2007 | Creta et al. | 710/5 |
| 7,181,556 | B2 * | 2/2007 | Gwilt | 710/110 |
| 7,457,905 | B2 * | 11/2008 | Gehman | 710/315 |
| 7,813,363 | B2 * | 10/2010 | Lee et al. | 370/412 |
| 7,934,046 | B2 * | 4/2011 | Butter et al. | 710/317 |
| 8,006,016 | B2 * | 8/2011 | Muller et al. | 710/240 |
| 2003/0126336 | A1 * | 7/2003 | Creta et al. | 710/305 |
| 2004/0024948 | A1 * | 2/2004 | Winkler et al. | 710/311 |
| 2007/0067528 | A1 * | 3/2007 | Schaffer et al. | 710/116 |
| 2009/0109996 | A1 | 4/2009 | Hoover et al. | |
| 2009/0125706 | A1 | 5/2009 | Hoover et al. | |
| 2011/0106991 | A1 * | 5/2011 | Kawahito | 710/110 |
| 2012/0099475 | A1 * | 4/2012 | Tokuoka | 370/253 |

FOREIGN PATENT DOCUMENTS

| | | |
|---|---|---|
| JP | 2009-110512 | 5/2009 |
| JP | 2009-116872 | 5/2009 |
| KR | 1020070061307 | 6/2007 |
| KR | 1020080054981 | 6/2008 |

\* cited by examiner

*Primary Examiner* — Raymond Phan
(74) *Attorney, Agent, or Firm* — F. Chau & Associates, LLC

(57) ABSTRACT

A memory interleaving device includes a slave interface, a master interface, and a crossbar switch. The slave interface is connected with a master intellectual property through an on-chip network. The master interface is connected with a slave intellectual property. The crossbar switch connects the slave interface with the master interface. The memory interleaving device transmits requests from the master intellectual property to the slave intellectual property, receives data or responses respectively corresponding to the requests from the slave intellectual property, and transmits the data or responses to the master intellectual property in an order in which the requests are received.

20 Claims, 19 Drawing Sheets

FIG. 5
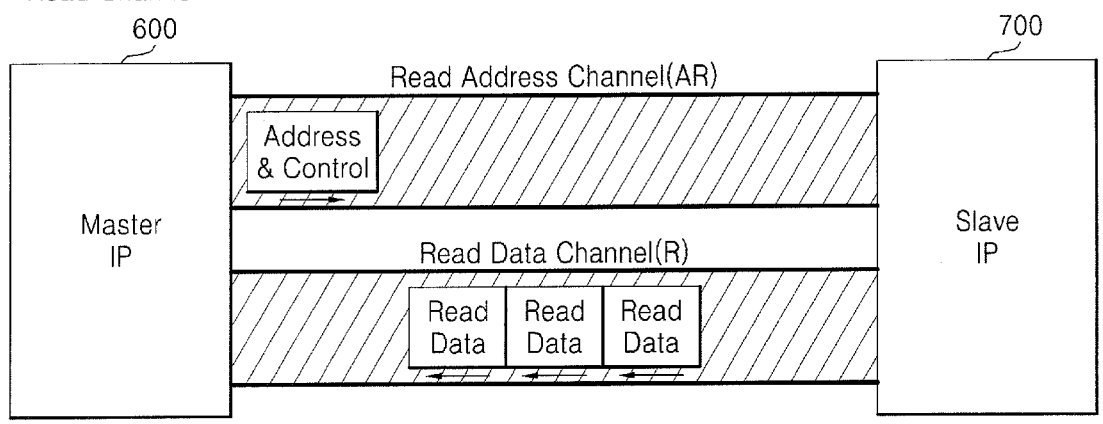
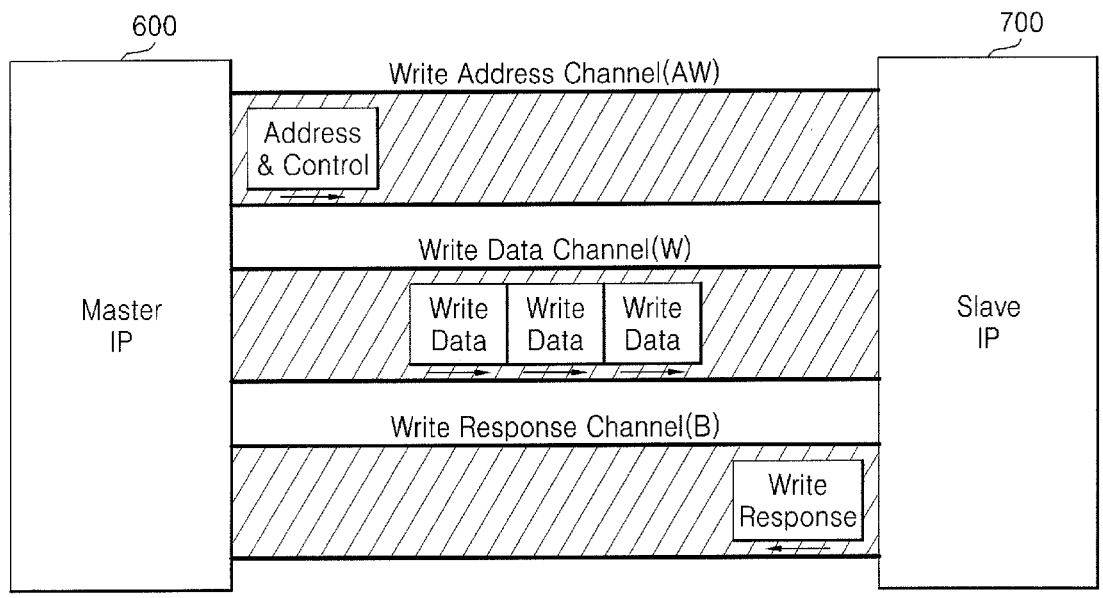

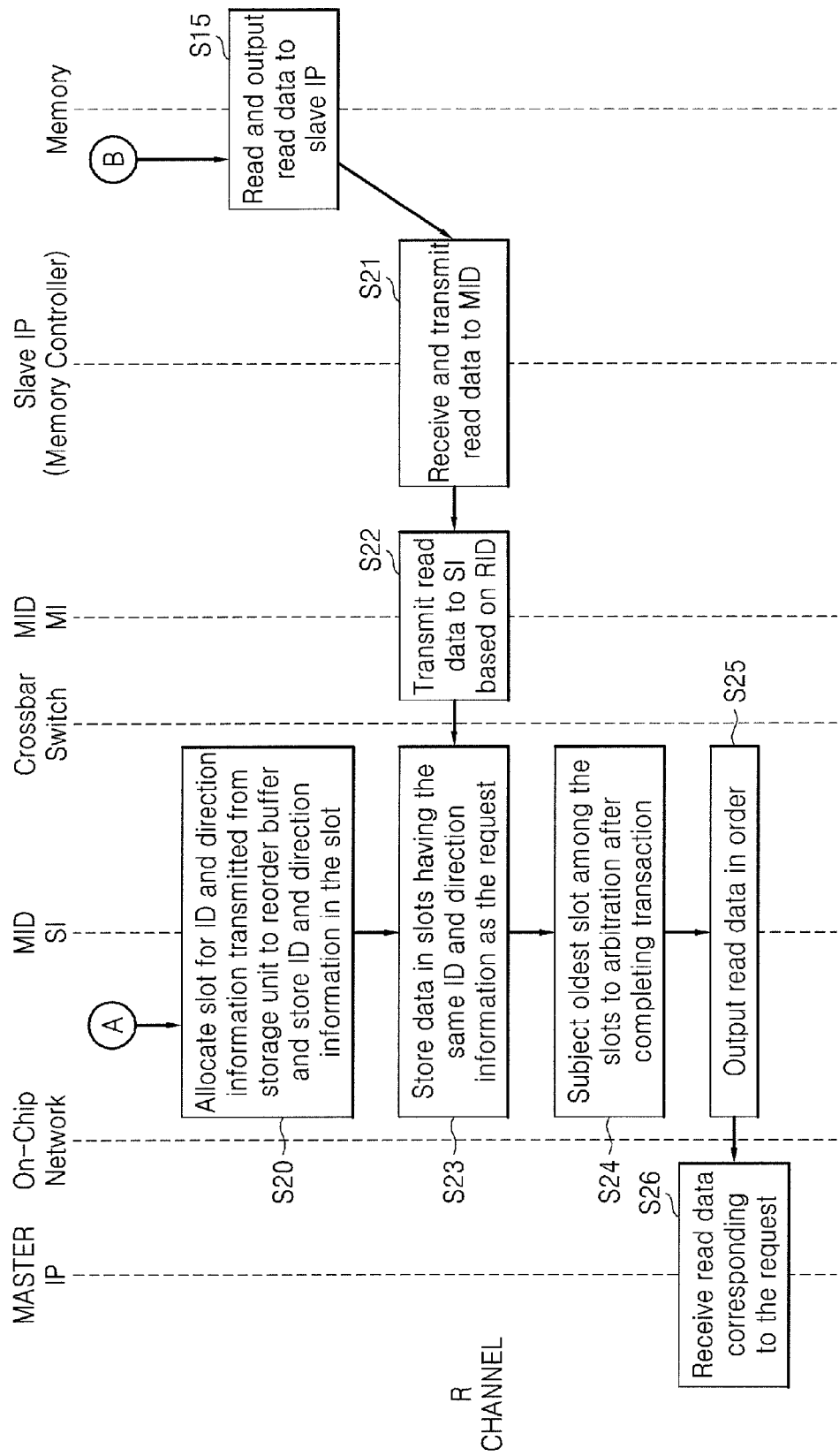

FIG. 10C

| ID0 | | | | | | | | |
|---|---|---|---|---|---|---|---|---|
| | SL0 | SL1 | SL2 | SL3 | SL4 | SL5 | SL6 | SL7 |
| 251 | head1 | head1 | head1 | head1 | head1 | head1 | head1 | head1 |
| | head0 | head0 | head0 | head0 | head0 | head0 | head0 | head0 |
| | | next | next | next | next | next | next | next |
| | | BRESP | BRESP | BRESP | BRESP | BRESP | BRESP | BRESP |
| | | BVALID | BVALID | BVALID | BVALID | BVALID | BVALID | BVALID |
| | | BVALID_count | BVALID_count | BVALID_count | BVALID_count | BVALID_count | BVALID_count | BVALID_count |
| | | AW_pre_count | AW_pre_count | AW_pre_count | AW_pre_count | AW_pre_count | AW_pre_count | AW_pre_count |
| | | dir | dir | dir | dir | dir | dir | dir |
| | occupy | occupy | occupy | occupy | occupy | occupy | occupy | occupy |
| | | 1 | 2 | 3 | 4 | 5 | 6 | 7 |

US 8,886,861 B2

MEMORY INTERLEAVING DEVICE TO RE-ORDER MESSAGES FROM SLAVE IPS AND A METHOD OF USING A REORDER BUFFER TO RE-ORDER MESSAGES FROM SLAVE IPS

CROSS-REFERENCE TO RELATED APPLICATIONS

This application claims priority under 35 U.S.C. §119(a) to Korean Patent Application No. 10-2010-0130329, filed on Dec. 17, 2010, the disclosure of which is incorporated by reference in its entirety herein.

BACKGROUND

1. Technical Field

Embodiments of the present inventive concept relate to a system on chip (SoC), and more particularly, to a network interface included in a SoC.

2. Discussion of Related Art

An SoC is an integrated circuit that integrates several components of a computer or other electronic systems into a single chip or system. As an example, an SoC may include a processor and intellectual properties (IPs) controlled by the processor. However, it can be difficult to interface IPs of different types with one another within the SoC.

SUMMARY

According to an exemplary embodiment of the present inventive concept, a memory interleaving device includes a slave interface connected with a master intellectual property through an on-chip network, a master interface connected with a slave intellectual property, and a crossbar switch configured to connect the slave interface with the master interface. The memory interleaving device transmits requests from the master intellectual property to the slave intellectual property, receives data or responses respectively corresponding to the requests from the slave intellectual property, and transmits the data or responses to the master intellectual property in an order in which the requests are received.

The slave interface may include an R channel block including a reorder buffer configured to store read data received from the slave intellectual property in response to a read memory request of the master intellectual property, a first selector configured to output the read data in order, and a first storage unit configured to store an ID and a direction of the read memory request. The slave interface may further include an AR channel block including an address decoder configured to decode an address of the read memory request and a second selector configured to transmit a decoded address to the slave intellectual property.

The master interface may include an AR channel block including a third selector configured to transmit the decoded address of the read memory request from the crossbar switch to the slave intellectual property and an R channel block including a fourth selector configured to transmit the read data from the slave intellectual property to the slave interface.

Alternatively, the slave interface may include an AW channel block, a W channel block, and a B channel block. The AW channel block may include an address decoder configured to decode an address of a write memory request of the master intellectual property and a first selector configured to transmit a decoded address to the slave intellectual property. The W channel block may include a first Wdata-pathQ configured to receive direction information extracted by the address decoder and control information extracted from write data and a second selector configured to receive the write data and output the write data to the slave intellectual property in response to a control signal output from the first Wdata-pathQ. The B channel block may include a reorder buffer configured to store a write response received from the slave intellectual property in response to the write memory request, a second storage unit configured to store an ID and a direction of the write memory request, and a third selector configured to output outputs of the reorder buffer in order.

The master interface may include an AW channel block, a W channel block, and a B channel block. The AW channel block may include a fourth selector configured to transmit the decoded address of the write memory request from the crossbar switch to the slave intellectual property. The W channel block may include a fifth selector configured to transmit the write data from the crossbar switch to the slave intellectual property in response to a control signal and a second Wdata-pathQ configured to remember an order in which the write memory request has been received and output the control signal based on the order. The B channel block may include a sixth selector configured to transmit the write response from the slave intellectual property to the slave interface.

According to an exemplary embodiment of the present invention, there is provided a memory interleaving method in a read path. The memory interleaving method includes a master intellectual property transmitting a read memory request to a slave interface of a memory interleaving device through an on-chip network; outputting a decoded address obtained by decoding an address of the read memory request to a master interface connected with a slave intellectual property corresponding to the read memory request and inputting an ID and direction information of the read memory request to a reorder buffer; the reorder buffer allocating a slot, which has not been reserved, for the ID and the direction information; the master interface transmitting the decoded address to the slave intellectual property corresponding to the read memory request; the slave intellectual property reading data corresponding to the read memory request and transmitting the data to the master interface; the master interface transmitting the data to the slave interface that has transmitted the read memory request; the reorder buffer storing the data received from the slave interface in the slot allocated for the ID and the direction information; subjecting an oldest slot among slots having the same ID and direction information as the read memory request to arbitration after a data transaction is completed; and the slave interface transmitting in order data subjected to the arbitration to the master intellectual property, which has transmitted the read memory request, through the on-chip network.

According to an exemplary embodiment of the present inventive concept, a memory interleaving method for a write path includes a master intellectual property transmitting a write memory request to a slave interface of a memory interleaving device through an on-chip network, the master intellectual property transmitting write data to the slave interface through the on-chip network, outputting a decoded address obtained by decoding an address of the write memory request to a master interface connected with a slave intellectual property corresponding to the write memory request and inputting direction information of the write memory request to a Wdata-pathQ of a W channel, transmitting the write data to the master interface in an order in which the write memory request is received in response to a signal from the Wdata-pathQ and transmitting an ID and the direction information of the write memory request from the write data to a reorder buffer, the reorder buffer allocating a slot (e.g., which has not been reserved) for the ID and the direction information of the write memory request, the master interface transmitting the decoded address to the slave intellectual property corresponding to the write memory request, the master interface padding the write data with an ID of the slave interface that has transmitted the write memory request and transmitting the write data padded with the ID to the slave intellectual property in the order in which the write memory request is received, the slave intellectual property allocating a storage in response to the write memory request, storing the write data in the storage, and outputting a write response to the master interface that has transmitted the write memory request, the master interface transmitting the write response to the slave interface according to the ID of the slave interface which the write data has been padded with, the reorder buffer storing the write response received from the slave interface in the slot allocated for the ID and the direction information, subjecting an oldest slot among slots having the same ID and direction information as the write memory request to arbitration after a write response transaction is completed, and the slave interface transmitting in order data subjected to the arbitration to the master intellectual property, which has transmitted the write memory request, through the on-chip network.

According to an exemplary embodiment of the inventive concept, a method includes a master intellectual property transmitting a read memory request to a slave interface of a memory interleaving device through an on-chip network, the slave interface decoding an address of the read memory request, outputting the decoded address to a master interface of the memory interleaving device that is connected with a slave intellectual property corresponding to the read memory request, and storing ID and direction information of the read memory request into a reorder buffer, the reorder buffer allocating a slot for the ID and the direction information, the master interface transmitting the decoded address to the slave intellectual property corresponding to the read memory request, the slave intellectual property reading data corresponding to the read memory request and transmitting the data to the master interface, the master interface transmitting the data to the slave interface that has transmitted the read memory request, the reorder buffer storing the data received from the slave interface into the slot allocated for the ID and the direction information, subjecting an oldest slot among slots of the reorder buffer having the same ID and direction information as the read memory request to arbitration after a data transaction is completed, and the slave interface transmitting in order data subjected to the arbitration to the master intellectual property, which has transmitted the read memory request, through the on-chip network.

According to an exemplary embodiment of the inventive concept, a memory interleaving device includes a slave interface connected with a plurality of master intellectual properties IPs, a master interface connected with a plurality of slave IPs, and a crossbar switch configured to exchange data between the slave interface and the master interfaces. The memory interleaving device is configured to determine an order in which requests are received from the master IPs for slave IPs, transmit the requests to the corresponding slave IPs, receive corresponding messages from the slave IPs for each request in response to the transmitted requests, re-order the messages to correspond with the determined order, and output the re-ordered messages to the corresponding master IPs.

The slave interface may include a reorder buffer configured to store the re-ordered message and a first selector configured to sequentially output the re-ordered messages. The slave interface may additionally include an address decoder configured to decode addresses of the requests and a second selector configured to transmit the decoded addresses to the slave IPs. The master interface may include a third selector configured to transmit the decoded addresses from the crossbar switch to the slave IPs and a fourth selector configured to transmit the messages to the slave interface.

The slave interface may include an address decoder configured to decode an address of a write memory request of the master intellectual property, a first selector configured to transmit a decoded address to the slave intellectual property, a first Wdata-pathQ configured to receive direction information extracted by the address decoder and control information extracted from write data, a second selector configured to receive the write data and output the write data to the slave intellectual property in response to a control signal output from the first Wdata-pathQ, a reorder buffer configured to store a write response received from the slave intellectual property in response to the write memory request, a second storage unit configured to store an ID and a direction of the write memory request and a third selector configured to output outputs of the reorder buffer in order.

The master interface may include a fourth selector configured to transmit the decoded address of the write memory request from the crossbar switch to the slave intellectual property, a fifth selector configured to transmit the write data from the crossbar switch to the slave intellectual property in response to a control signal, a second Wdata-pathQ configured to remember an order in which the write memory request has been received and output the control signal based on the order and a sixth selector configured to transmit the write response from the slave intellectual property to the slave interface.

BRIEF DESCRIPTION OF THE DRAWINGS

The present inventive concept will become more apparent by describing in detail exemplary embodiments thereof with reference to the attached drawings in which:

FIG. 5 is a conceptual diagram showing a transaction flow in a read channel and a write channel in the AXI between a master IP and a slave IP;

FIG. 9A and FIG. 9B are flowcharts of a memory interleaving method performed in the read path of FIG. 8 according to exemplary embodiments of the present inventive concept;

FIG. 10C is a diagram of a write channel reorder buffer in the MID according to an exemplary embodiment of the present inventive concept;

DETAILED DESCRIPTION

Figure 1:
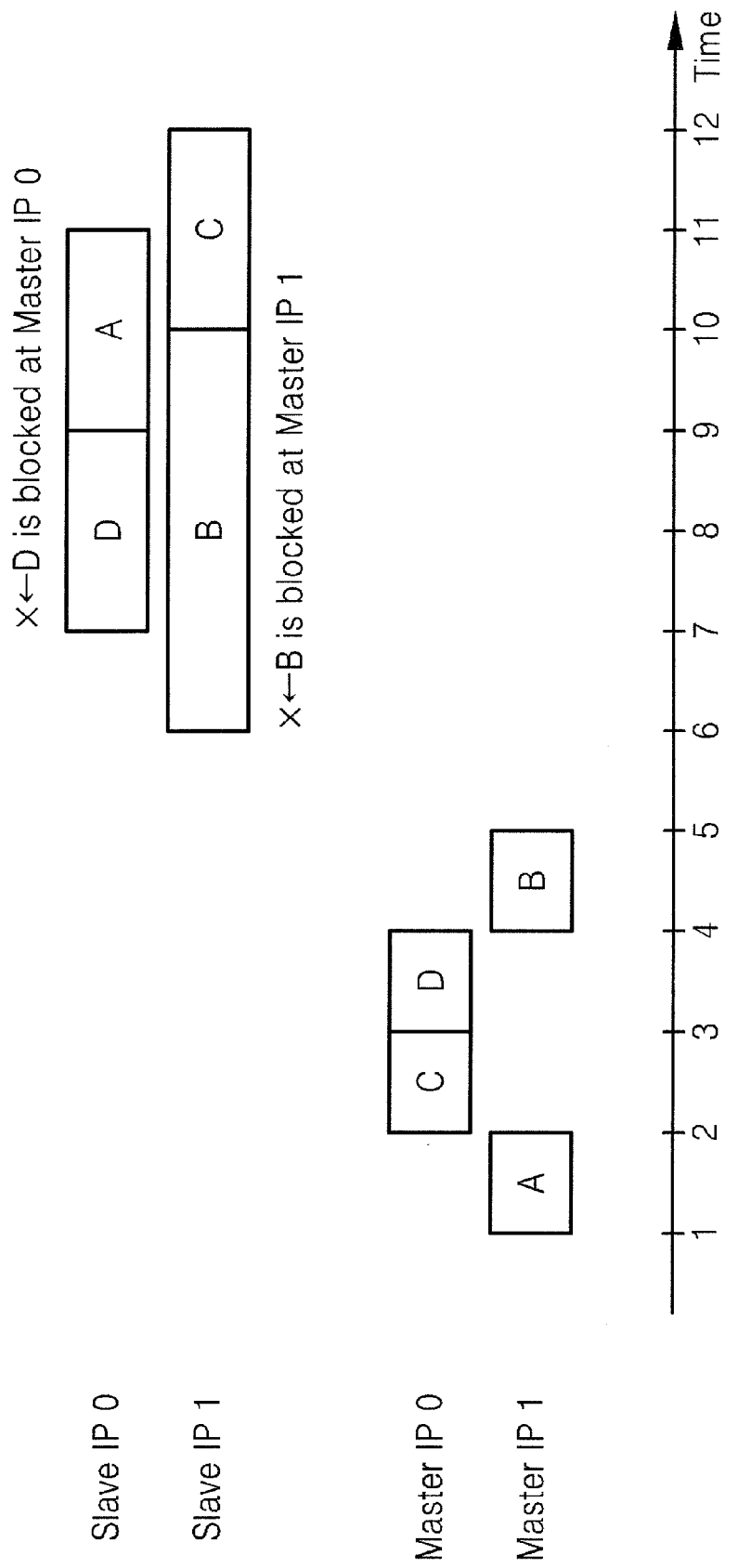
FIG. 1 is a conceptual diagram for explaining deadlock occurring when two master intellectual properties (IPs) access two slave IPs in a system on chip (SoC) network interface.

The present inventive concept will now be described more fully hereinafter with reference to the accompanying drawings, in which embodiments thereof are shown. The inventive concept may, however, be embodied in many different forms and should not be construed as limited to the exemplary embodiments set forth herein. In the drawings, the size and relative sizes of layers and regions may be exaggerated for clarity. Like numbers refer to like elements throughout.

It will be understood that when an element is referred to as being "connected" or "coupled" to another element, it can be directly connected or coupled to the other element or intervening elements may be present.

For ease of discussion, intellectual properties (IPs) that are subjects of data writing and reading are referred to as master IPs and IPs that are objects of data writing and reading are referred to as slave IPs. For example, a master IP can direct that a writing reading be performed, while a slave IP could be written or read. An IP may also be referred to as an IP core, which is a block of logic or data that can be used in making a field programmable gate array (FPGA) or an application specific integrated circuit (ASIC) for a product. Examples of master IPs include central processing units (CPUs), codecs, displays, image sensors, etc. A codec is a device that is capable of encoding or decoding data. Examples of slave IPs include memory mapping devices. A master IP and a slave IP transmit data through a network-on-chip (NoC) router. A network interface (NI) is installed between the NoC router and each of the master IP and the slave IP. The master IP and the slave IP may communicate with one another across a bus using an Advanced Microcontroller Bus Architecture (AMBA) or an Open Core Protocol. Examples of an AMBA-based bus type are Advanced High-Performance Bus (AHB), Advanced Peripheral Bus (APB), and Advanced eXtensible Interface (AXI). An AMBA AXI protocol may be more appropriate for high-speed/high performance systems that other on-chip bus protocols. The AMBA AXI protocol is a protocol in which channels for read, write, and write-response are separated from one another and operate independently of one another. Further, the AXI protocol supports multiple outstanding addresses and write data interleaving. Although it is explained herein that packet data is transmitted between IPs according to the AXI protocol, an Open Core Protocol (OCP) can also be used in alternate embodiments of the inventive concept.

FIG. 1 is a conceptual diagram for explaining deadlock occurring when two master IPs access two slave IPs in a SoC network interface.

It is assumed that each master IP uses a unique transaction ID and a memory access order is retained at an input/output (I/O) port of each master IP. Master IP 1 sends request A to slave IP 0. Master IP 0 sends request C to slave IP 1 and request D to slave IP 0. Thereafter, master IP 1 sends request B to slave IP 1. It is further assumed that the four requests have a related read channel, the requests are independent from one another, and that there is no delay in transmission and reception of each request at either an on-chip network or a slave IP.

To increase the utilization of memory, slave IP 0 reorders requests A and D and slave IP 1 reorders requests B and C when outputting data responsive to the corresponding requests. Accordingly, slave IP 0 outputs data corresponding to request D prior to data corresponding to request A and slave IP 1 outputs data corresponding to request B prior to data corresponding to request C. If request B accesses a current open row of slave IP 1, even when request B (t4) arrives later than request C (t2), the data (t6) corresponding to request B is transmitted prior to the data (t10) corresponding to request C. However, even if the data corresponding to request B is prepared and transmitted to master IP 1 first, the data corresponding to request B cannot enter master IP 1 until the data (t9) corresponding to request A comes to master IP 1 due to a memory request order. For this reason the data corresponding to request B remains in the system. Similarly, when the data (t7) corresponding to request D is prepared and transmitted to master IP 0 prior to the data (t10) corresponding to request C, the data corresponding to request D remains in the system due to the memory request order. However, when the data corresponding to requests B and D remain in the system, the data channel flow is blocked. As a result, the data corresponding to request A cannot be transmitted to master IP 1 and the data corresponding to request C cannot be transmitted to master IP 0 as well. This state is referred to as deadlock.

The deadlock caused by an in-order requirement may be overcome by restricting parallel memory access of an on-chip network. However, it is difficult to maximize performance by simply rearranging a memory map to parallelize memory access. Many IPs are designed to entirely or partially rely on in-order access. Accordingly, existing IPs designed for in-order access would need to be redesigned to allow for out-of-order delivery to maximize memory parallelism. However, such a redesign could take a large amount of time or result in excessive verification costs. When redesign of IPs is difficult, approaches for using a reorder buffer in an on-chip network or in a network entry stage or approaches for realizing a multi-port slave IP may be considered. However, these approaches may increase design complexity and introduce latency. Therefore, embodiments of the present invention provide a memory interleaving device and method that uses a reorder buffer, which may prevent deadlock and maximize memory parallelism.

Figure 2:
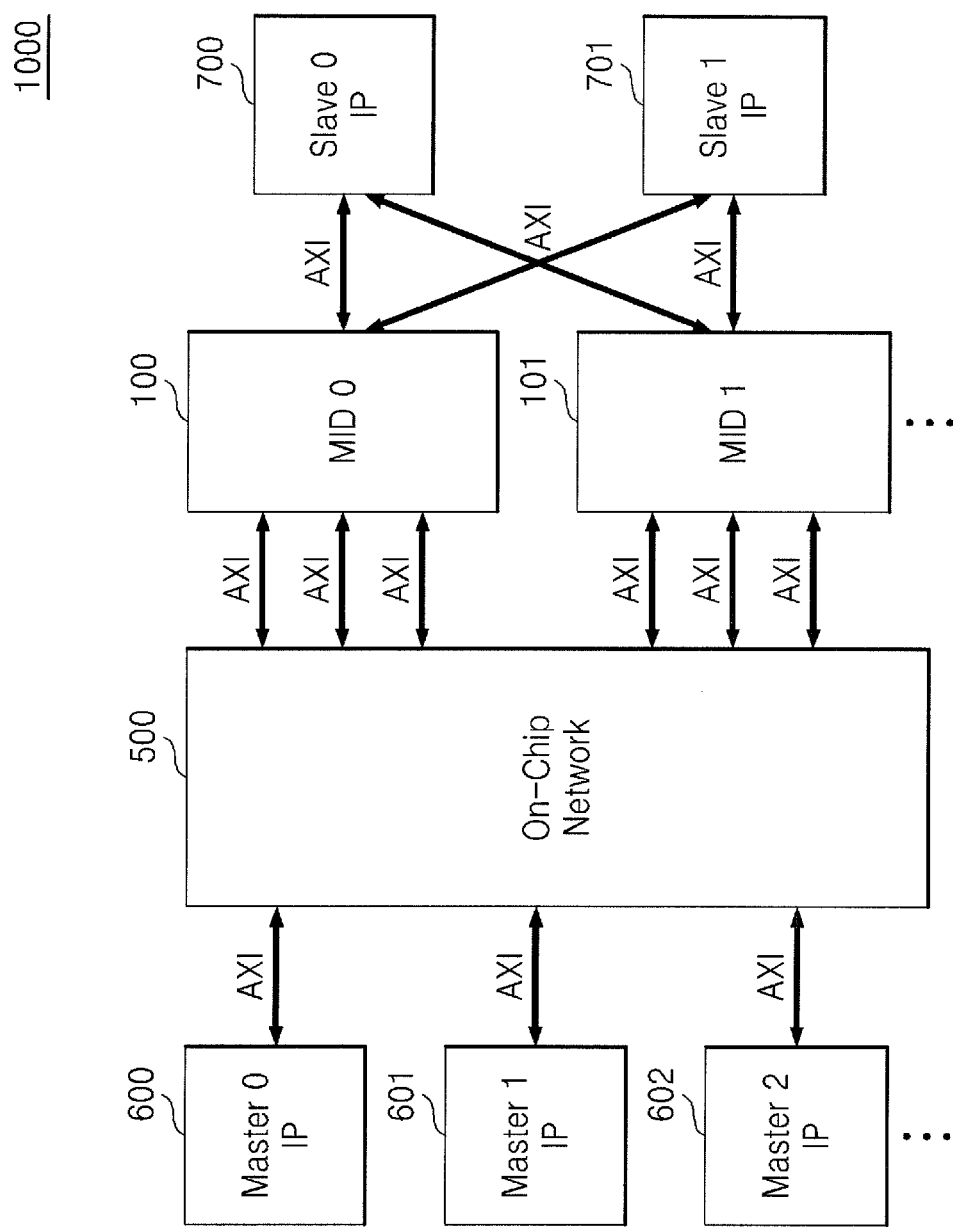
FIG. 2 is a block diagram of a SoC including memory interleaving devices according to exemplary embodiments of the present inventive concept.

FIG. 2 is a block diagram of a SoC 1000 including memory interleaving devices 100 and 101 according to an exemplary embodiment of the present inventive concept.

Referring to FIG. 2, the SoC 1000 includes a plurality of master IPs 600, 601, and 602, an on-chip network 500, a plurality of slave IPs 700 and 701, and the memory interleaving devices (MIDs) 100 and 101.

The master IPs 600, 601, and 602 are IPs that are subjects of data reading and writing, such as central processing units (CPUs), codecs, displays, and image sensors.

The on-chip network 500 is a part of a network interface relating to data flow in the SoC 1000 and may be implemented on a single or more chips.

The slave IPs 700 and 701 are IPs that are objects of data writing or reading, such as memory mapping devices.

The MIDs 100 and 101 have three AXI channels connected with the on-chip network 500 and two AXI channels respectively connected with the slave IPs 700 and 701. However, the number of AXI channels is not limited thereto. For example, the number of AXI channels may vary with the number of master or slave IPs connected with each of the MIDs 100 and 101. For example, when three slave IPs and two master IPs are present, a MID could have three dedicated AXI channels to communicate with the three slave IPs and two other dedicated AXI channels to communicate with the two master IPs.

Each of the master IPs 600, 601, and 602, the on-chip network 500, the MIDs 100 and 101, and each of the slave IPs 700 and 701 are connected with one another via a bus including a plurality of channels. The channel configuration of the channels may correspond to the AXI protocol as an example, but embodiments of the present inventive concept are not limited thereto. For example, the channel configuration may correspond to the open core, AHB, or APB protocols in alternate embodiments.

Figure 3:
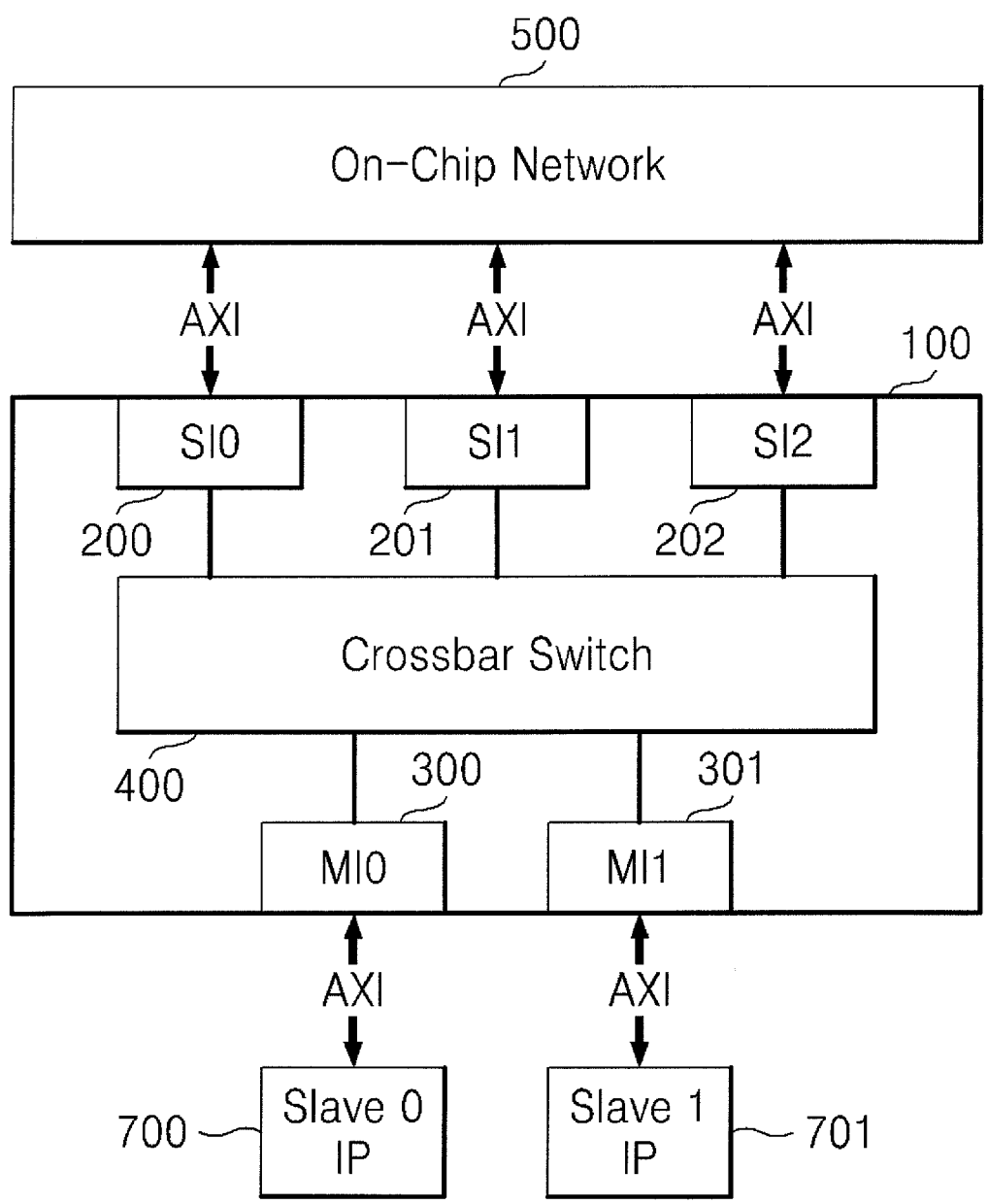
FIG. 3 is a diagram showing a memory interleaving device (MID) according to an exemplary embodiment of the present inventive concept.

FIG. 3 is a diagram showing the MID 100 according to an exemplary embodiment of the present inventive concept.

Referring to FIG. 3, the MID 100 includes three slave interfaces 200, 201, and 202, two master interfaces 300 and 301 according to AXI channel ports. The MID 100 also includes a crossbar switch 400, an Advanced Peripheral Bus (APB) input port (not shown), and an interrupt output port (not shown). Here, when a subject in data flow is considered, an interface connected with a master IP is referred to as a slave interface (SI) and an interface connected with a slave IP is referred to as a master interface (MI).

The SIs 200, 201, and 202 are connected with the on-chip network 500. The MIs 300 and 301 are connected with the slave IPs 700 and 701, respectively. The SIs 200, 201, and 202 and the MIs 300 and 301 are all connected with the crossbar switch 400.

An APB from a CPU (not shown) is connected with the MID 100 at the APB input port. An APB signal is generated from a firmware code in the CPU. The APB signal includes various control signals including a control signal for setting a middle bit when the MID 100 performs memory interleaving.

The interrupt output port monitors whether an unexpected situation occurs in the MID 100. When an unexpected situation occurs, the interrupt output port generates an interrupt signal to inform the CPU.

Figure 4:
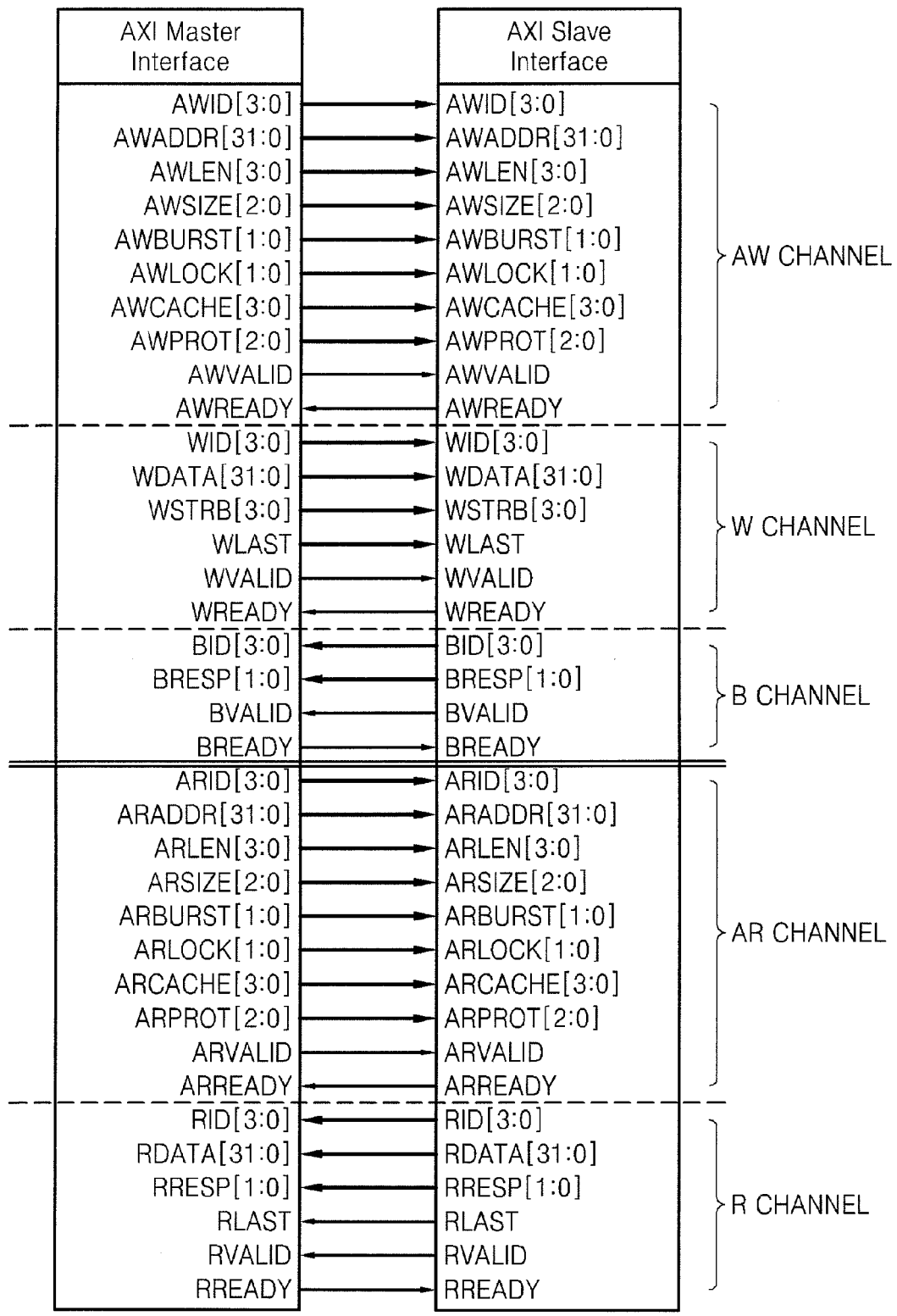
FIG. 4 is a diagram showing an Advanced eXtensible Interface (AXI) channel according to the Advanced Microcontroller Bus Architecture (AMBA)3 AXI protocol.

FIG. 4 is a diagram showing an AXI channel according to the Advanced Microcontroller Bus Architecture (AMBA)3 AXI protocol.

Referring to FIG. 4, a bus relating to an I/O port complies with the AMBA3 AXI protocol. An AXI channel bus may include five channels, i.e., a read address channel (referred to as an "AR channel"), a read data channel (referred to as an "R channel"), a write address channel (referred to as an "AW channel"), a write data channel (referred to as a "W channel"), and a write response channel (referred to as a "B channel"). The AW channel is used by a master IP sending a write data request across a write path. The W channel is used to send write data to a slave IP in response to the write-data request. The B channel is used to transmit a write response indicating that the write data has been written to the slave IP. The AR channel is used by a master IP sending a read-data request across a read path. The R channel is used to transmit read data from a slave IP to the master IP.

FIG. 5 is a conceptual diagram showing the transaction flow in a read channel and a write channel in the AXI between the master IP 600 and the slave IP 700.

Referring to FIG. 5, the AR channel and the R channel are used in the read path and the AW channel, the W channel, and the B channel are used in the write path.

In the read path, the master IP 600 addresses "read data" to the slave IP 700 and sends a control signal using the AR channel. In response to the addressing, the slave IP 700 transmits data (e.g., read data) to the master IP 600 using the R channel.

In the write path, the master IP 600 sends a packet (e.g., with Address & Control information) requesting data writing to the slave IP 700 through the AW channel and then transmits data (e.g., write data) to the slave IP 700 through the W channel. Thereafter, the slave IP 700 transmits a write response packet indicating that the data writing has been completed to the master IP 600 through the B channel.

Figure 6:
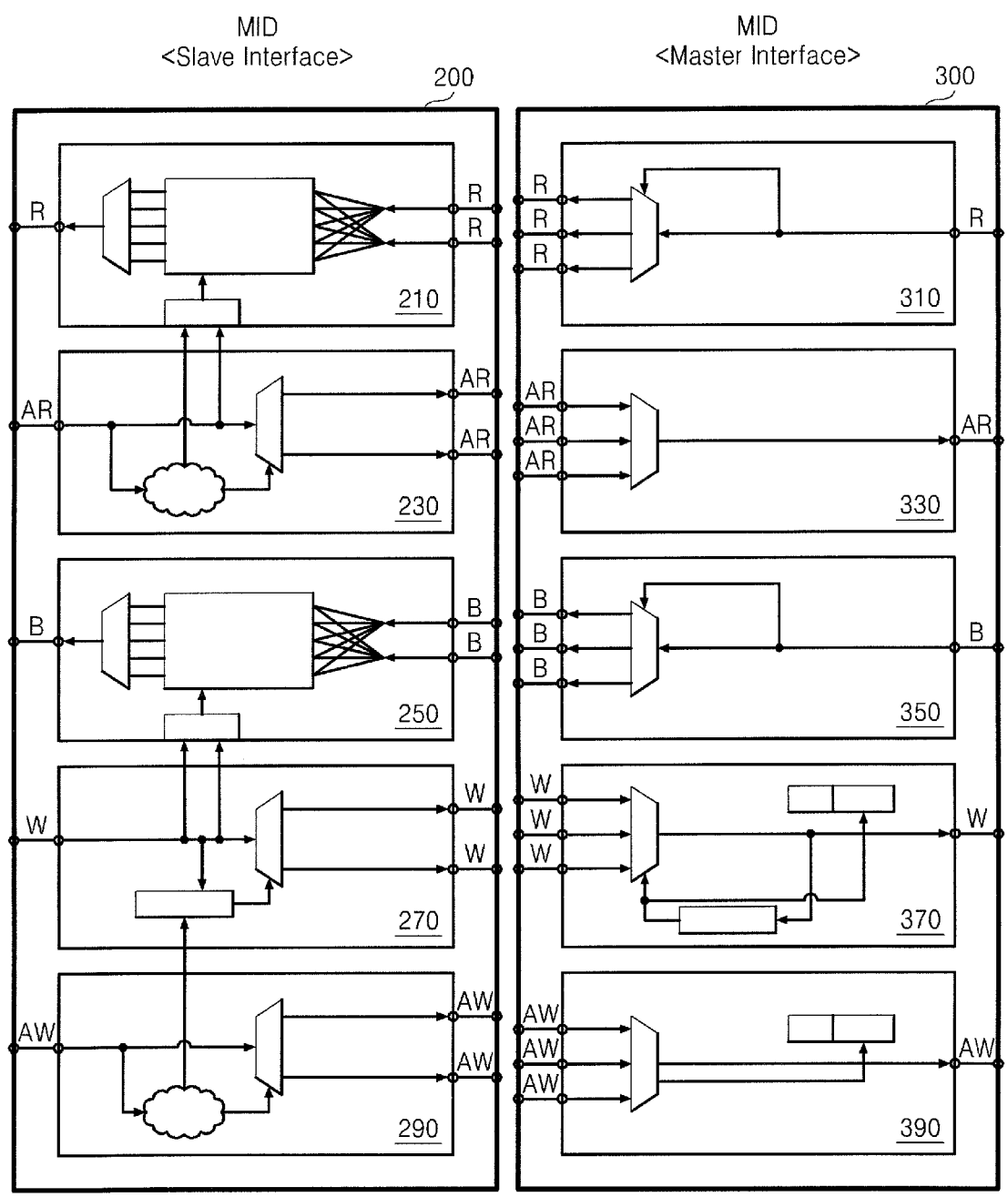
FIG. 6 is a schematic block diagram showing interfaces in the MID according to exemplary embodiments of the present inventive concept.

FIG. 6 is a schematic block diagram showing a slave interface (e.g., SI 200) and a master interface (e.g., MI 300) of the MID 100 according to exemplary embodiments of the present inventive concept.

Referring to FIG. 6, the SI 200 of the MID 100 includes an AR channel block 230, an R channel block 210, a B channel block 250, a W channel block 270, and an AW channel block 290. The MI 300 of the MID 100 includes an AR channel block 330, an R channel block 310, a B channel block 350, a W channel block 370, and an AW channel block 390. The channel blocks 210, 230, 250, 270, and 290 of the SI 200 are respectively connected with the channel blocks 310, 330, 350, 370, and 390 of the MI 300 through the crossbar switch 400. The structure of each channel block will be described with reference to FIGS. 7A through 7C and FIGS. 10A through 10C.

Figure 7A:
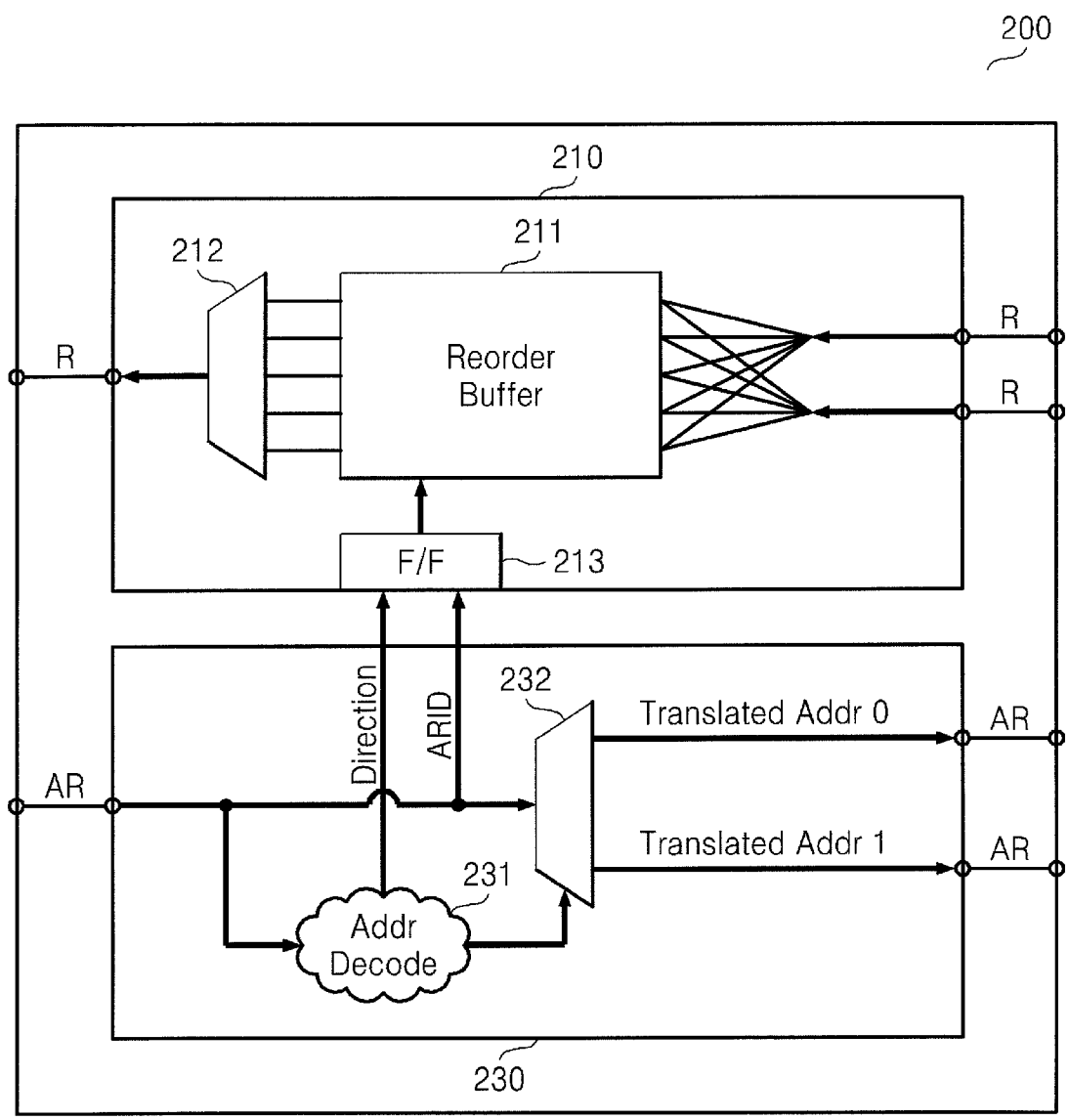
FIG. 7A is a block diagram of a read channel slave interface in the MID according to an exemplary embodiment of the present inventive concept.

FIG. 7A is a block diagram of the read channel SI 200 in the MID 100 according to exemplary embodiments of the present inventive concept. The SI 200 includes the R channel block 210 and the AR channel block 230.

Referring to FIG. 7A, the AR channel block 230 includes an address decoder 231 and a first selector 232. The address decoder 231 receives a read memory request from the on-chip network 500 and performs address translation. The first selector 232 selects and outputs a decoded address to the crossbar switch 400.

The R channel block 210 includes a reorder buffer 211, a first storage unit 213, and a second selector 212. The reorder buffer 211 receives read data from the crossbar switch 400 and temporarily stores the read data. The first storage unit 213 extracts (or receives) a transfer address ARID and a direction, which relate to a position to which the read data is transmitted, from the AR channel block 230 and temporarily stores the transfer address ARID and the direction. The second selector 212 outputs the read data in order.

Figure 7B:
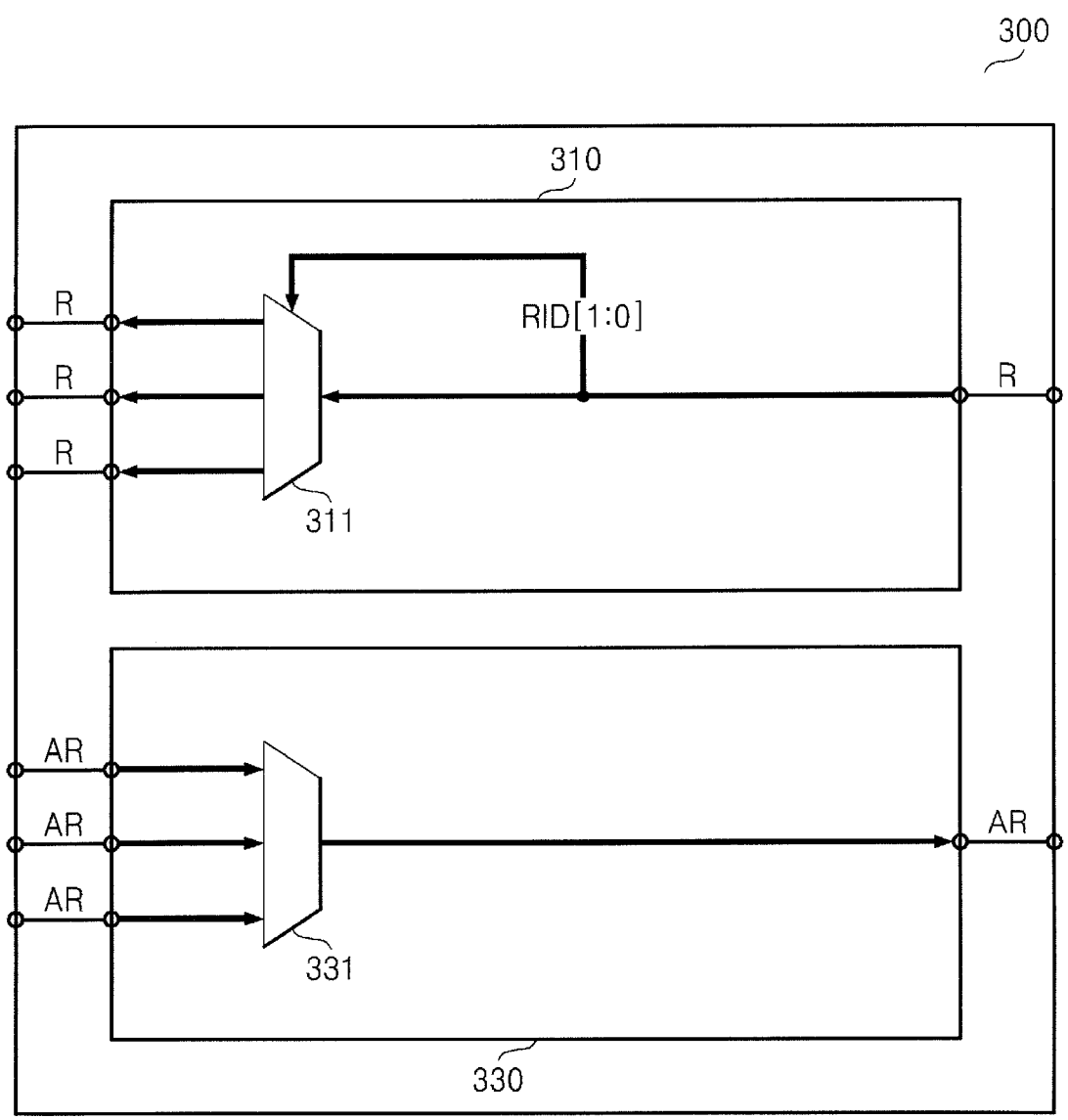
FIG. 7B is a block diagram of a read channel master interface the MID according to an exemplary embodiment of the present inventive concept.

FIG. 7B is a block diagram of the read channel MI 300 in the MID 100 according to exemplary embodiments of the present inventive concept. The MI 300 includes the AR channel block 330 and the R channel block 310.

Referring to FIG. 7B, the AR channel block 330 is used to transmit a read memory request and includes a third selector 331. When the read memory request is generated by the master IP 600, the third selector 331 selectively transmits the read memory request to the slave IP 700 or 701 corresponding to the request.

The R channel block 310 is used to transmit read data to the crossbar switch 400 and includes a fourth selector 311, which receives the data read from the slave IP 700 or 701 in response to the request and transmits the read data to the R channel block 210 of the SI 200 with reference to an ID padding RID in the read data. However, the present inventive concept is not limited to the current embodiments as other elements may be further provided.

Figure 7C:
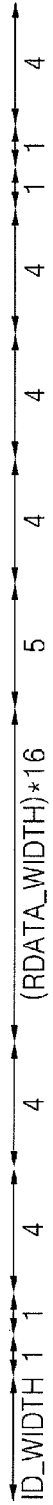
FIG. 7C is a diagram of a read channel reorder buffer of the interface of FIG. 7A according to an exemplary embodiment of the present inventive concept.

FIG. 7C is a diagram of the read channel reorder buffer 211 in the MID 100 according to exemplary embodiments of the present inventive concept.

Referring to FIG. 7C, each of the SIs (i.e., 200, 201, and 202) in the MID 100 may include the reorder buffer 211. The reorder buffer 211 includes a plurality of slots SL0 through SL7, each of which includes fields IDn, occupy, direction (dir), AR_pre_count, RLAST_count, buffer RB_n for temporarily storing data, R_count, waddr-reg, raddr-reg, next, head0, head1, and LEN.

The reorder buffer 211 may be sized to store transactions numbering as many as the read acceptance capability of an AXI input channel to optimize timing. For example, when the AR channel block 230 of the SI 200 in the MID 100 accepts a read memory request, the reorder buffer 211 has free storage for storing a current transaction and thus immediately transmits the read memory request to the slave IP 700 or 701 without performing a check. Allocating of a data slot to the reorder buffer 211 in response to the read memory request may be performed in a subsequent cycle.

In the embodiments illustrated in FIG. 7C, the reorder buffer 211 includes eight slots SL0 through SL7 on the assumption that the read acceptance capability of the SI 200 is 8. However, the read acceptable capability may be greater than or less than 8 in alternate embodiments. The occupy field of each of the slots SL0 through SL7 has an occupy bit indicating whether each slot has been allocated in response to a memory request. When the AR channel block 230 transmits a read memory request, an identifier ID (e.g., a transfer address ARID) and direction information of the request are transmitted to the reorder buffer 211 through the first storage unit 213. A slot that has not been reserved yet (e.g., a slot whose occupy bit is 0) is found, and the ID and the direction information are stored in the IDn field (where "n" is any one of integers 0 through 7) and the dir field, respectively. Thereafter, the occupy bit is set to 1. At this time, the number of slots having the same ID among slots having an occupy bit of 1 in the reorder buffer 211, in which allocation is taking place, is stored in the AR_pre_count field. The AR_pre_count field indicates the number of read transactions that need to be delivered prior to the current read transaction.

The reorder buffer 211 includes data buffers RB_0 through RB_7 having a size of the width of read data RDATA_WIDTH multiplied by a predetermined maximum burst length (e.g., 16) so that a read transaction of an R channel is completely stored in each slot SLn. The waddr-reg field is a first in first out (FIFO) write pointer in the first storage unit 213 and the raddr-reg field is a FIFO read pointer in the first storage unit 213. Read data that is returned in response to a read memory request is stored in the data buffer (or FIFO) RB_n in the slot SLn that has the ID and the direction of the read memory request based on the FIFO pointers stored in the waddr-reg field and the raddr-reg field. For example, when the reorder buffer 211 of the R channel block 210 receives the read data, the reorder buffer 211 finds a slot that has the occupy bit of 1 and has an ID and direction information the same as those of the read memory request based on the FIFO pointers. When more than one slot have the same ID, head information is used.

The head information indicates whether a current slot is able to receive read data through the R channel. For example, head information set to "head0" indicates whether the slot can receive read data from slave IP 0 and head information set to "head 1" indicates whether the slot can receive read data from slave IP 1. To correctly update the head information, each slot of the reorder buffer 211 is linked to other slots having the same ID as the slot using a linked list in the order in which the slots receive a read memory request. A pointer of the linked list is stored in the next field.

The read data is stored in the data FIFO RB_n of a slot that receives the read memory request first among the slots that have the same ID and have not yet received all of the read data. The head field of the slot may have a high value. At this time, the R_count field of the slot having the same ID as the ID of the read memory request indicates the current number of read data packets transmitted in response to the read memory request. The LEN field of the slot having the same ID as the ID of the read memory request indicates the total number of read data packets that will be transmitted in response to the read memory request. For example, the R_count field is increased by 1 every time a packet is stored in the data FIFO RB_n, so that it can be recognized that transmission of the read data to the current slot has completed when the LEN field equals the R_count field. Then, a subsequent slot is found according to the pointer of the linked list in the next field and the head information of the subsequent slot is updated.

Read data stored in the data buffer RB_n of each slot is transmitted to the on-chip network 500 after being subjected to arbitration. At this time, only the oldest slot among the slots having the same ID is allowed to be subjected to the arbitration to maintain in-order delivery. To satisfy this condition, the RLAST_count field is compared with the AR_pre_count field. The AR_pre_count field indicates the number of slots having the same ID in the reorder buffer 211 at the time when the slots are allocated. The RLAST_count field indicates the number of completed transactions having the same ID after IDs are allocated.

When only slots having an RLAST_count field equal the AR_pre_count field are allowed to be subjected to arbitration, the in-order delivery of read transactions having the same ID can be secured. When the RLAST_count field equals the AR_pre_count field, it is recognized that transmission of all transactions that have the same ID as a current transaction and are older than the current transaction have completed. The arbitration may be performed by the reorder buffer 211 or the second selector 212 or by a special module.

Figure 8:
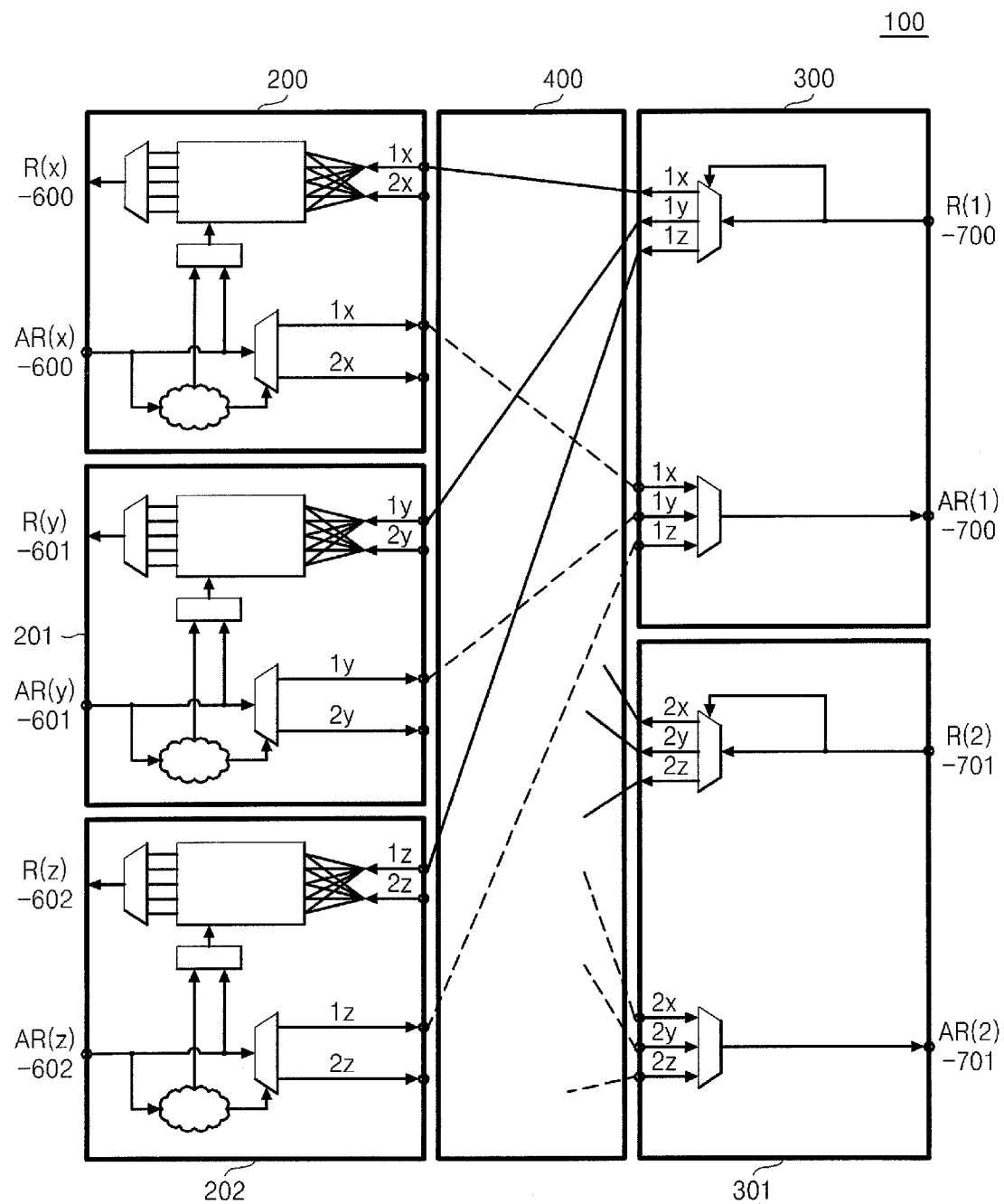
FIG. 8 is a conceptual diagram showing a transaction flow in a read path of the memory interleaving device of FIG. 6 according to an exemplary embodiment of the present inventive concept.

FIG. 8 is a conceptual diagram showing a transaction flow in the read path of the MID 100 according to exemplary embodiments of the present inventive concept. The operation of the MID 100 in the read path will be described with reference to FIGS. 7A through 7C and FIG. 8.

When the master IP 600 transmits a read memory request to an AR channel AR(x)-600 of the SI 200 of the MID 100 through the on-chip network 500, the read memory request is input to the AR channel block 230 of the SI 200 and the address decoder 231 performs address translation. Direction information and an ID (e.g., an ARID) are extracted from the address decoder 231 and the read memory request, respectively, and transmitted to the first storage unit (e.g., flip-flop (F/F)) 213 of the R channel block 210. The reorder buffer 211 of the R channel block 210 receives the ID and the direction information, which have been transmitted from the AR channel block 230, from the first storage unit 213; allocates storage for storing read data which will be transmitted from the MI 300 in the MID 100; and stores the ID (e.g., a transaction identification) and the direction information in the slot SLn. The read memory request is subjected to address interleaving by the address decoder 231 and then transmitted through the crossbar switch 400 to the AR channel block 330 of the MI 300 corresponding to a decoded address 1x in the MID 100. When this memory interleaving is performed, memory requests are not sent to a small number of slave IPs, but to all slave IPs within a system. As a result, stable load balancing may be achieved.

The AR channel block 330 of the MI 300 selects a value from input values, i.e., read memory requests transmitted from one or more SIs (e.g., 200, 201, and 202) and transmits the selected read memory request to the slave IP 700 through an AR channel AR(1)-700. The slave IP 700 reads data from a memory device in response to the read memory request received through the AR channel AR(1)-700 and transmits the read data to an R channel R(1)-700 of the R channel block 310 of the MI 300. The read data includes ID information RID corresponding to the ARID of the master IP 600 that has originally output the read memory request and is thus transmitted to the SI 200 connected to the master IP 600 by the selector 311 based on the ID information RID. The read data is transmitted to the R channel block 210 of the SI 200 through the R channel of the crossbar switch 400 and then input to the reorder buffer 211.

The read data input to the reorder buffer 211 is temporarily stored in the slot SLn that has been allocated based on the ID and the direction information. When all data bursts respectively corresponding to read memory requests are stored in the reorder buffer 211, the reorder buffer 211 outputs the data bursts, which have been received out of order, to an R channel R(x)-600 through the second selector 212 according to an in-order operation. Each data burst output to the R channel R(x)-600 is sent through the on-chip network 500 to the master IP 600 that has originally output the read memory request corresponding to the data burst. The above-described operations may be applied to the master IPs 601 and 602, the MIDs 100 and 101, and the SIs 200, 201, and 202 and the MIs 300 and 301 in each of the MIDs 100 and 101. The number of MIDs and the number of SIs or MIs in each MID are not limited to the above-described embodiments.

Figure 9A:
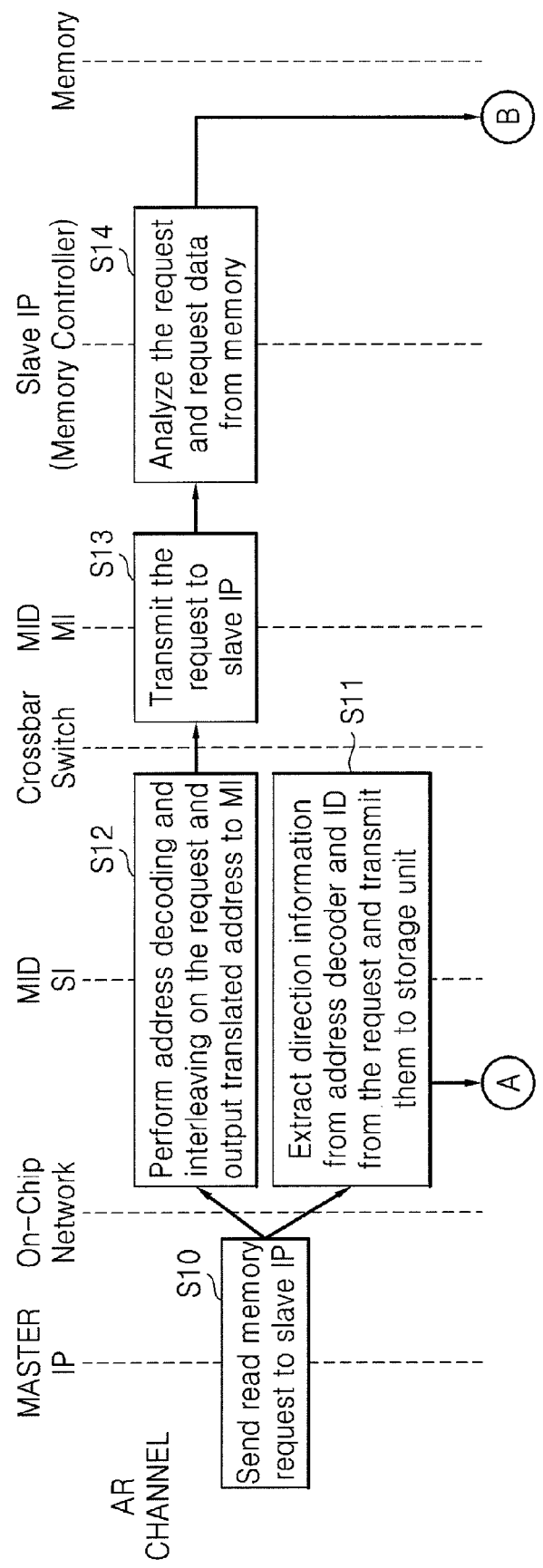

FIG. 9A and FIG. 9B are flowcharts of a memory interleaving method performed in the read path of the MID 100 according to exemplary embodiments of the present inventive concept.

Referring to FIG. 9A, a master IP sends a read memory request to a slave IP through an on-chip network to read data from memory in operation S10. The read memory request is input to the SI 200 of the MID 100. The AR channel block 230 extracts direction information by performing address decoding and extracts an ID from the read memory request and transmits the direction information and the ID to the R channel block 210 of the SI 200 in operation S11. The AR channel block 230 decodes the read memory request and outputs a decoded address to the MI 300 corresponding to the address by performing interleaving with respect to slave IPs in operation S12. The decoded address is input to the MIs 300 and 301 of the MID 100 through the crossbar switch 400. Each MI 300 or 301 transmits the read memory request to the slave IP corresponding thereto in operation S13. When the read memory request is input to the slave IP, the slave IP analyzes the read memory request and requests data from the memory in operation S14.

Referring to FIG. 9B, the memory outputs data corresponding to the read memory request to the slave IP in operation S15. A Reorder Buffer allocates one slot among a plurality of slots for ID and direction information transmitted from a first storage unit 213 to the reorder buffer 211 and stores the ID and the direction information in operation S20. The read data output from the memory is transmitted from the slave IP to the MI 300 of the MID 100 that has transmitted the read memory request to the slave IP in operation S21. The R channel block 310 of the MI 300 transmits the read data to the SI 200 that has transmitted the read memory request to the MI 300 based on an ID (i.e., RID) of the read transaction in operation S22. The read data is input to the R channel block 210 of the SI 200 through the crossbar switch 400 and is temporarily stored in slots having the same ID and direction information as the read memory request among the plurality of slots, which have already been allocated, in operation S23. When a read transaction is completed, only the oldest slot among the slots having the same ID and direction information as the read memory request are subjected to arbitration in operation S24, so that read data that have been out of order are rearranged and output in order to the on-chip network in operation S25. Through this procedure, the master IP receives the read data in order without redesign of the system in operation S26.

Figure 10A:
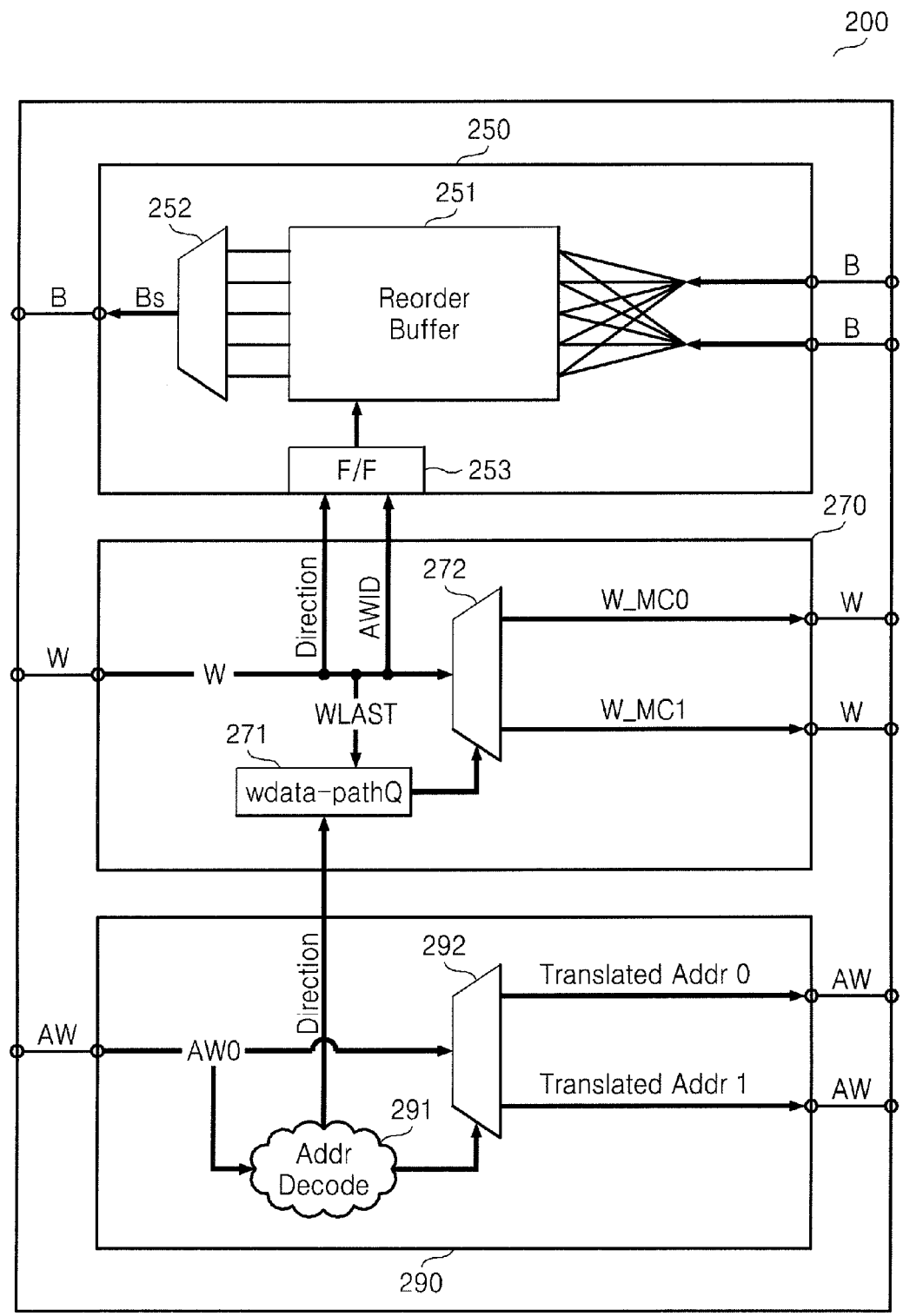
FIG. 10A is a block diagram of a write channel slave interface in the MID according to an exemplary embodiment of the present inventive concept.

FIG. 10A is a block diagram of the write channel SI 200 in the MID 100 according to exemplary embodiments of the present inventive concept.

While the implementation of the write path is similar to that of the read path, there are three differences therebetween. Firstly, an object reordered by a reorder buffer is a write response transmitted from a slave IP through the B channel. Accordingly, the structure of the reorder buffer is almost the same as that of a reorder buffer used in the read path, but the data FIFO in the reorder buffer used in the read path is replaced with space for storing a BVALID field and a BRESP field, which will be described below. Secondly, first write data needs to be transmitted first in the order of write memory requests in the write path according to the AXI protocol specification. In exemplary embodiments of the inventive concept, it is assumed that a write data interleaving depth is set to 1 in the on-chip network 500 and the slave IPs 700 and 701 so that write data is transmitted in order regardless of ID. To ensure the order of write data, a Wdata-pathQ is provided to remember the order in which write memory requests are transmitted. Thirdly, write data transmitted through the W channel needs to be transmitted to a slave IP in a correct direction. For this operation, the Wdata-pathQ is also provided in addition to the structure of an SI in the read path to determine a route.

Referring to FIG. 10A, the SI 200 in the write path includes the B channel block 250 for write response, the W channel block 270 for write data, and the AW channel block 290 for a write memory request.

The AW channel block 290 includes an address decoder 291 and a first selector 292. The address decoder 291 decodes an address of the slave IP 700 or 701, which will write data to memory. The first selector 292 transmits a decoded address to the MI 300 connected with the slave IP 700 or 701 through the crossbar switch 400.

The W channel block 270 is a channel through which write data is transmitted and includes a Wdata-pathQ 271 and a second selector 272. The Wdata-pathQ 271 temporarily stores a direction in which the write data will be written to memory and WLAST information indicating the end of write data transmission. The second selector 272 transmits the write data to the MI 300 connected with the slave IP 700 or 701, which will write the write data to memory, through the crossbar switch 400 according to the direction.

When the write memory request is transmitted to the slave IP 700 or 701, the B channel block 250 receives a write response indicating the write data has been written to the memory from the slave IP 700 or 701 and transmits the write response to the master IP 600, 601, or 602. The B channel block 250 includes a reorder buffer 251, a second storage unit 253, and a third selector 252. The reorder buffer 251 reorders write responses. The third selector 252 outputs the write responses in order. The second storage unit 253 stores an ID AWID and the direction of the slave IP 700 or 701 to which write data will be transmitted. However, the present inventive concept is not limited to the current exemplary embodiments.

Figure 10B:
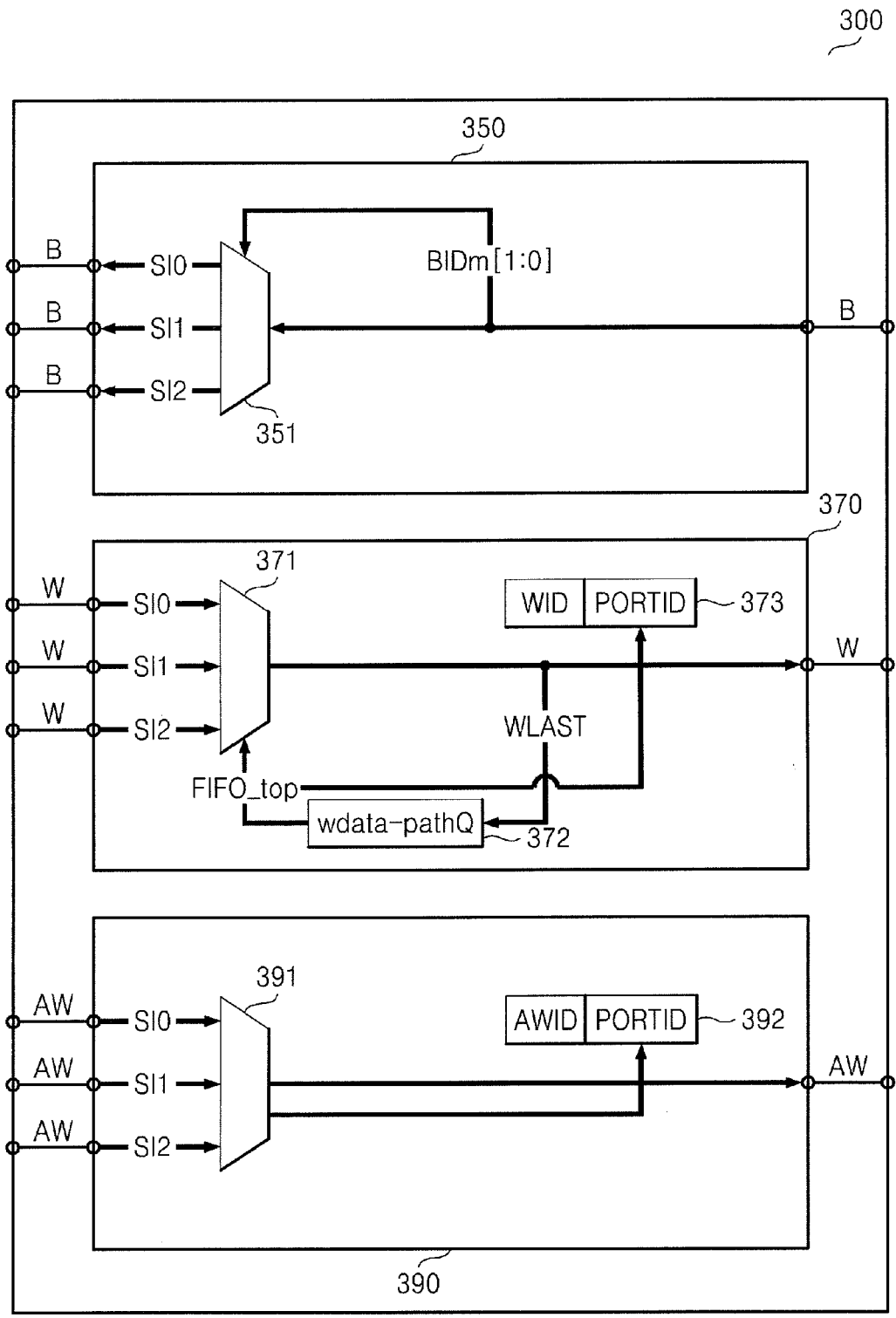
FIG. 10B is a block diagram of a write channel master interface in the MID according to an exemplary embodiment of the present inventive concept.

FIG. 10B is a block diagram of the write channel MI 300 in the MID 100 according to exemplary embodiments of the present inventive concept.

Referring to FIG. 10B, the MI 300 in the write path includes the B channel block 350 for a write response, the W channel block 370 for write data, and the AW channel block 390 for a write memory request.

The AW channel block 390 includes a fourth selector 391, which receives a write memory request from the AR channel block 290 of the SI 200 when the write memory request is generated by the master IP 600 and selectively transmits the write memory request to the slave IP 700 or 701 corresponding to the write memory request. At this time, the fourth selector 391 pads an ID AWID of the slave IP 700 or 701 with a port ID 392 of an SI that has sent the write memory request and outputs the AWID padded with the port ID 392 to the slave IP 700 or 701.

The W channel block 370 includes a fifth selector 371 and a Wdata-pathQ 372. The fifth selector 371 receives write data, which has been output from the master IP 600 together with the write memory request, from the W channel block 270 of the SI 200 and selectively transmits the write data to the slave IP 700 or 701 corresponding to the write memory request. The Wdata-pathQ 372 remembers the order in which write memory requests are transmitted and ensures that a first write data packet is transmitted in order. At this time, the fifth selector 371 pads WID with a port ID 373 of the SI 200 that has transmitted the write data and outputs the WID padded with the port ID 373 to the slave IP 700 or 701.

The B channel block 350 includes a sixth selector 351, which receives a write response from the slave IP 700 or 701 responding to the write memory request and transmits the write response to an SI corresponding to a master IP based on an ID BIDm with which the write response is padded. However, the present inventive concept is not limited to the current exemplary embodiments.

FIG. 10C is a diagram of the write channel reorder buffer 251 in the MID 100 according to exemplary embodiments of the present inventive concept.

Referring to FIG. 10C, the reorder buffer 251 includes a plurality of slots each of which includes fields IDn, occupy, dir, AW_pre_count, BVALID_count, BVALID, BRESP, next, head0, and head1. The reorder buffer 251 includes the eight slots SL0 through SL7 on the assumption that the write acceptance capability of the SI 200 is 8. Each of the slots SL0 through SL7 has an occupy field with an occupy bit indicating whether each slot has been allocated in response to a memory request. When the AW channel block 290 of the SI 200 transmits a write memory request, write data is transmitted to the W channel block 270 of the SI 200 and an ID of the master IP 600 that has sent the write data and direction information about a direction in which the write data will be written are extracted from the write data and transmitted to the reorder buffer 251 through the second storage unit 253. A slot that has not been reserved yet, (e.g., a slot whose occupy bit is 0) is found and the ID and the direction information are stored in the IDn field (where "n" is any one of integers 0 through 7) and the dir field, respectively. Thereafter, the occupy bit is set to 1. At this time, the number of slots having the same ID among slots having an occupy bit of 1 in the reorder buffer 251, in which allocation is taking place, is stored in the AW_pre_count field. The AW_pre_count field indicates the number of write transactions that need to be delivered prior to the current write transaction.

The reorder buffer 251 includes a BVALID field of 1 bit and a BRESP field of 2 bits instead of the data buffer RB_n of the reorder buffer 211 in the read path. The BVALID field indicates whether a write response is valid. When the write response is valid, the BVALID field is set to 1. When the write response is not valid, the BVALID field is set to 0. The BRESP field is a write response indicating the state of a write transaction and may be set to states such as OKAY, EXOKAY, SLVERR, or DECERR according to the AXI protocol specification. When a write response is transmitted to the reorder buffer 251, the reorder buffer 251 finds a slot that has the occupy bit offset to 1 and has an ID (BID) corresponding to the AWID of a write memory request and the direction information of the write memory request. When a plurality of such slots are found, head information is used.

The head information indicates whether a current slot is able to receive a write response from the slave IP 700 through the B channel. When the head information is set to "head0", it indicates whether the slot can receive read data from slave IP 0 (e.g., the slave IP 700). When the head information is set to "head1", it indicates whether the slot can receive read data from slave IP 1 (e.g., the slave IP 701). To correctly update the head information, each slot of the reorder buffer 251 is linked to other slots having the same ID as the slot using a linked list in the order in which the slots receive a write memory request. A pointer of the linked list is stored in a next field. In other words, a subsequent slot is found according to the pointer of the linked list in the next field and the head information of the subsequent slot is updated.

A write response in each slot is transmitted to the on-chip network 500 after being subjected to arbitration. At this time, only the oldest slot among the slots having the same ID is allowed to be subjected to the arbitration to maintain an in-order delivery. To satisfy this condition, the BVALID_count field is compared with the AW_pre_count field. The AW_pre_count field indicates the number of slots having the same ID in the reorder buffer 251 at the time when the slots are allocated. The BVALID_count field indicates the number of completed write transactions having the same ID after IDs are allocated. When the BVALID_count field equals the AW_pre_count field, it is recognized that transmission of all transactions that have the same ID as a current transaction and are older than the current transaction have completed. When only slots having a BVALID_count field equal to a AW_pre_count field are allowed to be subjected to arbitration, the in-order delivery of write transactions having the same ID can be secured.

Figure 11:
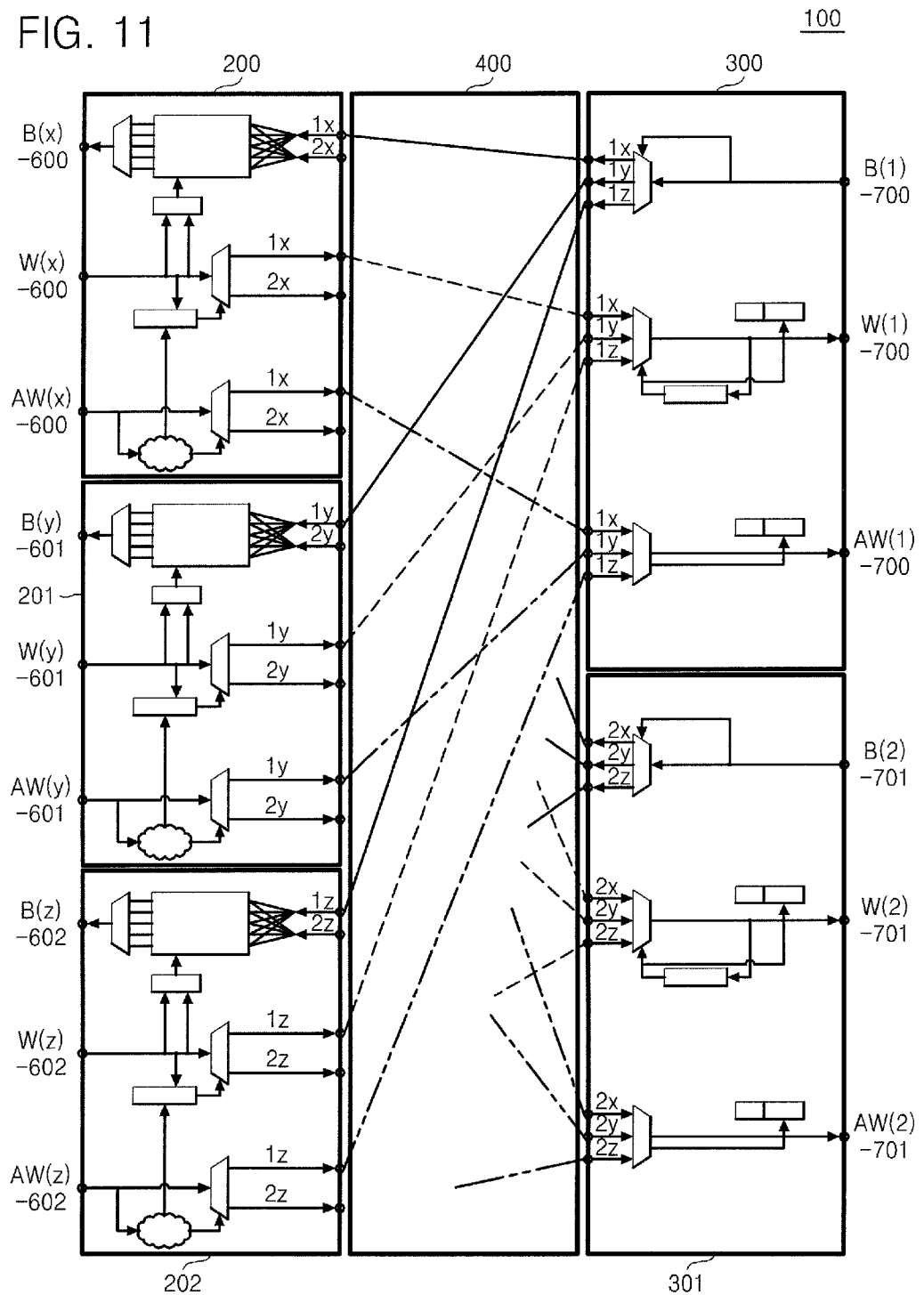
FIG. 11 is a conceptual diagram showing a transaction flow in a write path of the MID according to an exemplary embodiment of the present inventive concept.

FIG. 11 is a conceptual diagram showing a transaction flow in the write path of the MID 100 according to exemplary embodiments of the present inventive concept. The operation of the MID 100 in the write path will be described with reference to FIGS. 10A through 10C and FIG. 11.

When a write memory request is transmitted from the master IP 600 to an AW channel AW(x)-600 of the SI 200 of the MID 100 through the on-chip network 500, the write memory request is input to the AW channel block 290 of the SI 200 and a decoded address is output to the crossbar switch 400 according to a control signal of the address decoder 291.

At this time, the address decoder 291 performs address decoding using a bit at the center of a memory address according to an APB signal so that the first selector 292 is controlled to interleave a memory map across a plurality of slave IPs (e.g., slave IPs 700 and 701). The address decoder 291 also extracts direction information from the write memory request and transmits it to the Wdata-pathQ 271 of the W channel block 270. When the memory interleaving is performed, memory requests are not sent to a small number of slave IPs but to all slave IPs within a system. As a result, stable load balancing may be achieved.

Write data is padded with the ID AWID of the master IP 600 and direction information of the write data. The ID AWID and the direction information are transmitted to the second storage unit 253 of the B channel block 250. The WLAST information indicating the end of a write data packet is transmitted to the Wdata-pathQ 271. To enable the MID 100 to transmit the write data to a slave IP in a correct direction, the Wdata-pathQ 271 receives the direction information from the AW channel block 290 and refers to the direction information. Thereafter, the Wdata-pathQ 271 outputs a control signal determining a route of the write data to the second selector 272 and the second selector 272 transmits the write data to the MI 300 connected to the slave IP 700 corresponding to the direction information. In the B channel block 250, the ID AWID of the master IP 600 and the direction information of the write data are stored in the second storage unit 253 and then transmitted to the reorder buffer 251. When receiving the ID AWID and the direction information, the reorder buffer 251 allocates storage for a write response returning from the MI 300 of the MID 100 and stores the ID AWID and the direction information in a slot. The write memory request input to the SI 200 through the AW channel AW(x)-600 is subjected to address interleaving in the address decoder 291 of the AW channel block 290 and the second selector 272 transmits the decoded address to the AW channel block 390 of the MI 300 through an AW channel 1x. The AW channel block 390 of the MI 300 outputs input values transmitted from the SIs 200, 201, and 202 to the slave IP 700 using the fourth selector 391. At this time, the AWID of a memory request output through an AW channel AW(1)-700 is padded with the port ID 392 corresponding to the SI 200 that has sent the write memory request.

When write data W is transmitted from the master IP 600 to the SI 200 of the MID 100 through the on-chip network 500, the write data W is input to the W channel block 270 of the SI 200. The ID AWID and the direction information of the write data W are transmitted to the second storage unit 253 of the B channel block 250 and the WLAST information is transmitted to the Wdata-pathQ 271. The write data W is output in order by controlling an output of the second selector 272 referring to the direction information stored in the Wdata-pathQ 271. At this time, a write data interleaving depth is set to 1 and write data are output in order regardless of ID, and therefore, the Wdata-pathQ 271 remembers the order in which write data are transmitted and outputs a first write data bit in order. The write data output from the W channel block 270 is transmitted to a W channel 1x of the MI 300 connected with the slave IP 700 through the crossbar switch 400. The W channel block 370 identifies a write data burst corresponding to a current write memory request by recognizing the length of the write data burst based on the WLAST information. The Wdata-pathQ 372 of the W channel block 370 of the MI 300 outputs a control signal based on the WLAST information to the second selector 371 so that write data, which have been received out of order, are transmitted to the slave IP 700 in order. A write data burst is defined by the length of a write memory based on the WLAST information extracted from the write data W. At this time, an ID WID of a write data burst output to a W channel W(1)-700 is padded with the port ID 373 of the SI 200 that has been transmitted the write data W.

The slave IP 700 stores the write data transmitted through the W channel W(1)-700 at an address corresponding to the direction information in a memory in response to the write memory request received through the AW channel AW(1)-700 and transmits a write response indicating that the write data has been written to the memory to the B channel block 350 of the MI 300 in the MID 100 through a B channel B(1)-700. The write response includes ID information BIDm corresponding to the WID of the master IP 600 that has addressed a "write memory" and is output to a B channel 1x of the SI 200 corresponding to the master IP 600. The write response is transmitted to the B channel block 250 of the SI 200 through the B channel of the crossbar switch 400 and input to the reorder buffer 251. The write response is temporarily stored in a slot that has been allocated to store the ID AWID and the direction information in the reorder buffer 251. The reorder buffer 251 stores write responses respectively corresponding to write memory requests and outputs the write responses that have been received out of order to a B channel B(x)-600 through the third selector 252 according to an in-order operation. The write response output to the B channel B(x)-600 is sent to the master IP 600, which has addressed the "write memory", through the on-chip network 500. The above-described operations may be applied to the master IPs 601 and 602, the MIDs 100 and 101, and the SIs 200, 201, and 202 and the MIs 300 and 301 in each of the MIDs 100 and 101. The number of MIDs and the number of SIs or MIs in each MID are not limited to the above-described embodiments.

Figure 12A:
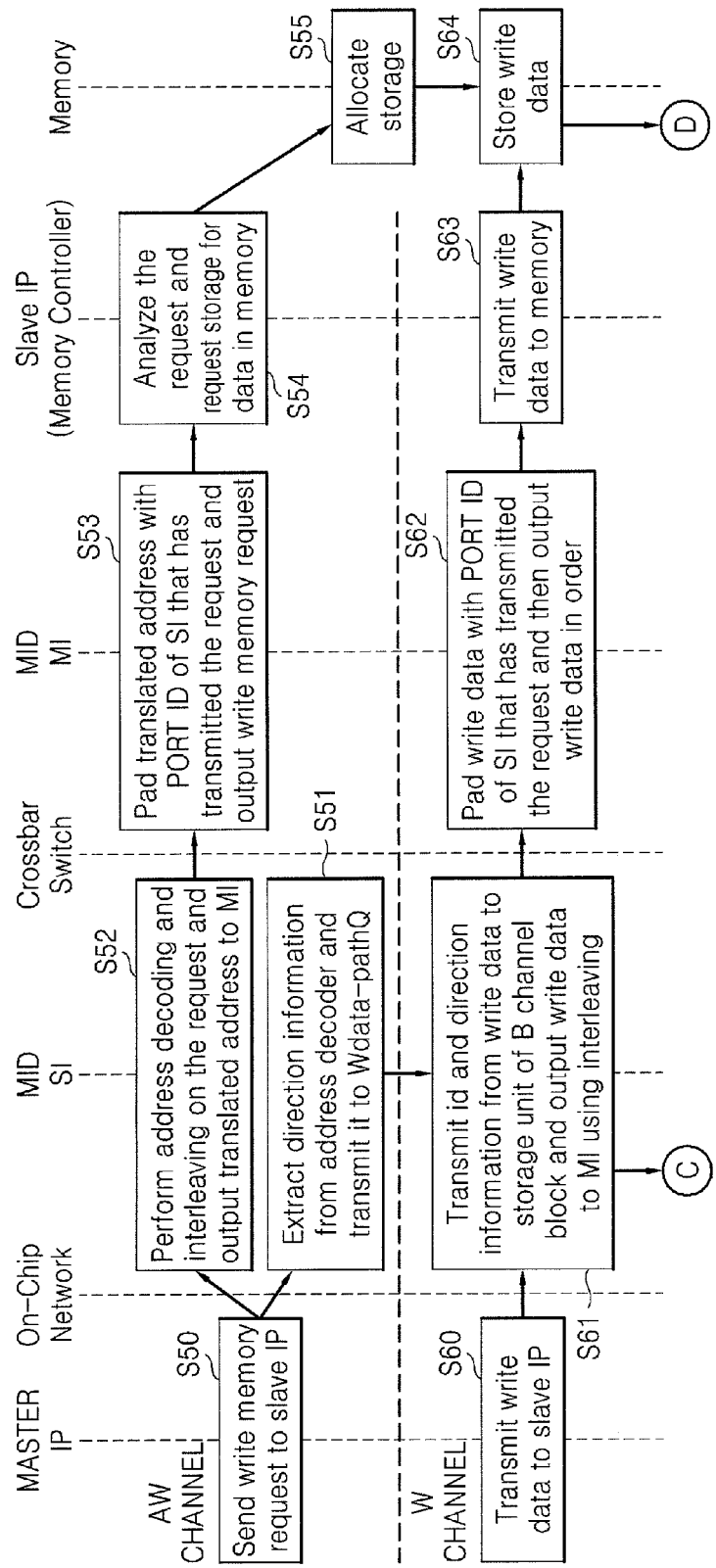
FIG. 12A and FIG. 12B are flowcharts of a memory interleaving method performed in the write path of the MID according to exemplary embodiments of the present inventive concept.
Figure 12B:
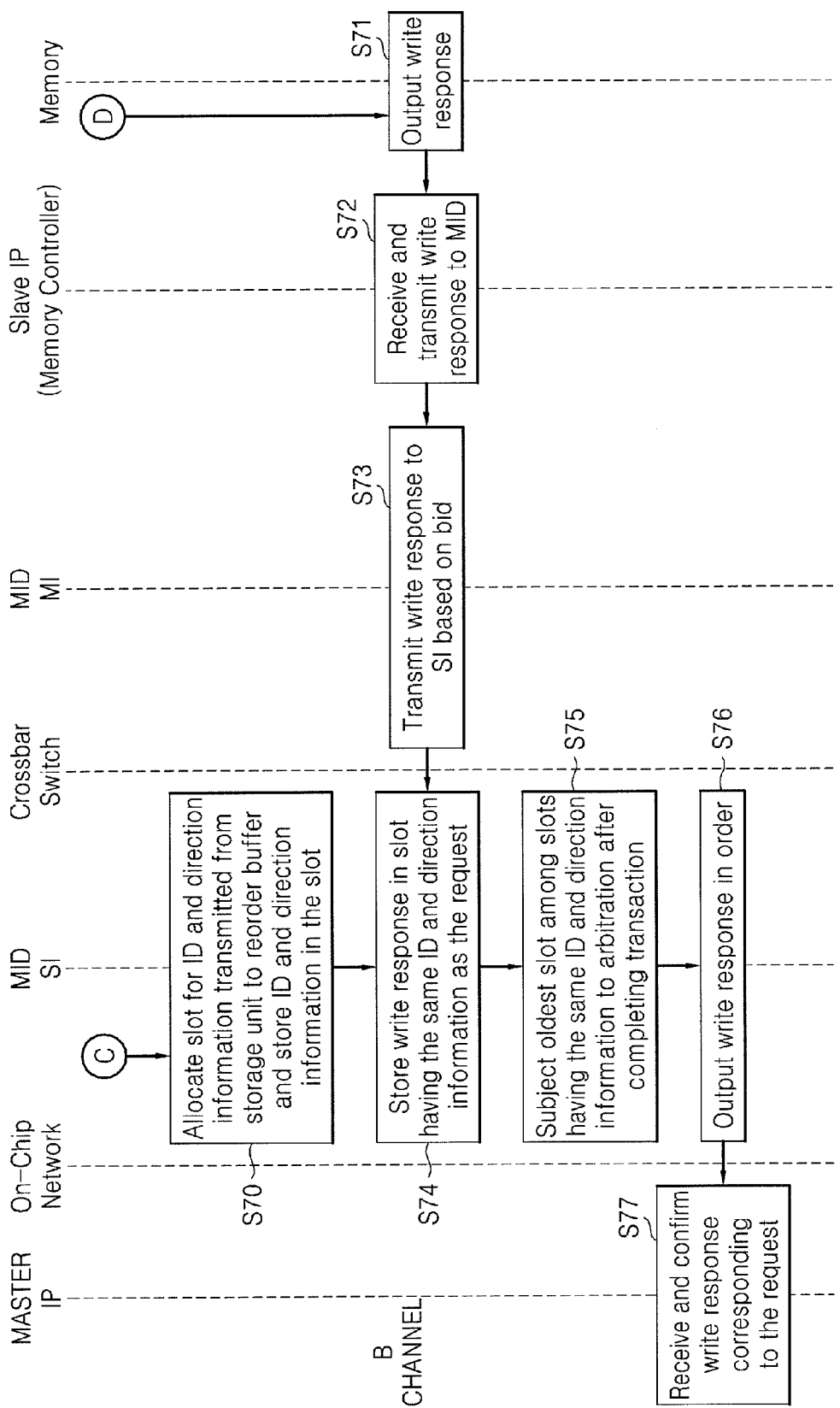

FIG. 12A and FIG. 12B are flowcharts of a memory interleaving method performed in the write path of the MID 100 according to exemplary embodiments of the present inventive concept.

Referring to FIG. 12A, the master IP 600, 601, or 601 sends a write memory request to the slave IP 700 or 701 through the on-chip network 500 to write data to a certain memory in operation S50. The write memory request is input to the SI 200, 201, or 202 of the MID 100. The AW channel block 290 of the SI 200, 201, or 202 extracts direction information by performing address decoding and transmits the direction information to the W channel block 270 of the SI 200, 201, or 202 in operation S51. The AW channel block 290 decodes the write memory request and outputs a decoded address to the MI 300 or 301 corresponding to the address by performing interleaving with respect to slave IPs 700 and 701 in operation S52. The decoded address is input to the MI 300 or 301 of the MID 100 through the crossbar switch 400. At this time, the MI 300 or 301 pads the decoded address with the port ID of the SI 200, 201, or 202, which has transmitted the write memory request, and transmits the decoded address padded with the port ID to the slave IP 700 or 701 corresponding to the decoded address in operation S53. When the write memory request is input to the slave IP 700 or 701, the slave IP 700 or 701 analyzes the write memory request and requests storage for data written to the memory in operation S54. The memory allocates the storage for the data in response to the write memory request in operation S55. Meanwhile, the master IP 600, 601, or 602 transmits write data to the on-chip network 500 together with the write memory request in operation S60. The write data is input to the W channel block 270 of the SI 200, 201, or 202. The W channel block 270 transmits transaction ID and direction information from the write data to the B channel block 250 and outputs the write data to the MI 300 or 301 corresponding to the direction information, which has been received from the AW channel block 290 and temporarily stored in the W channel block 270, by performing interleaving using the direction information in operation S61. The write data is input to the W channel block 370 of the MI 300 or 301 through the crossbar switch 400. The W channel block 370 pads the write data with a port ID of the SI 200, 201, or 202, which has transmitted the write data, and then outputs the write data in the order in which the write memory request is received in operation S62. The slave IP 700 or 701 receives the write data and transmits it to the memory in operation S63. The memory stores the write data in the storage that has been allocated in response to the write memory request in operation S64.

Referring to FIG. 12B, The memory outputs a write response indicating that the write data has been stored in operation S71. The slave IP 700 or 701 receives the write response and transmits it to the MI 300 or 301 in operation S72. The write response is input to the B channel block 350 of the MI 300 or 301. The B channel block 350 analyzes a port ID BID with which the write response is padded and transmits the write response to the SI 200, 201, or 202, which has transmitted the write memory request in operation S73. When the write response is input to the SI 200, 201, or 202 of the MID 100, it is temporarily stored in a slot having the same ID and direction information as the write memory request among a plurality of slots that have been allocated in advance in operation S74. After a write transaction is completed, only the oldest slot among slots having the same ID and direction information is subjected to arbitration in operation S75, so that write responses that have been received out of order are rearranged and output to the on-chip network 500 in order in operation S76. Through this procedure, the master IP 600, 601, or 602 stores data in the memory and receive write responses in the order in which corresponding write memory requests are generated in operation S77 without redesign of a system.

Figure 13:
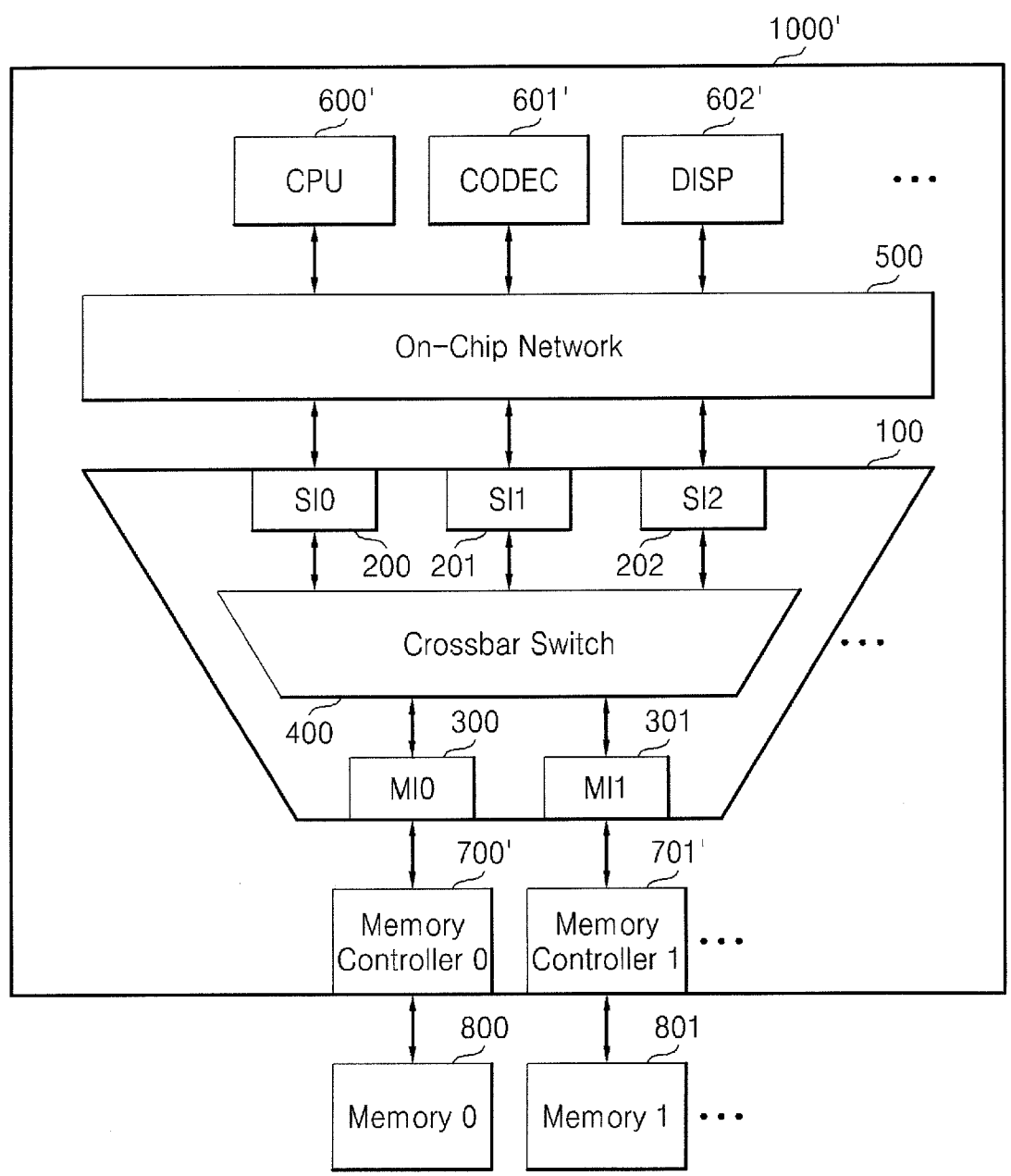
FIG. 13 is a block diagram of an SoC according to an exemplary embodiment of the present inventive concept.

FIG. 13 is a block diagram of a SoC 1000' according to an exemplary embodiment of the present inventive concept.

The SoC 1000' includes a plurality of master IPs, such as a controller (e.g., a CPU, 600', a codec 601', and a display 602') which are subjects of data reading and writing; the on-chip network 500; the MID 100; and a plurality of slave IPs, such as memory controllers 700' and 701', which are objects of data reading and writing. The memory controllers 700' and 701' are connected with memory devices 800 and 801, respectively.

As described above, according to at least one exemplary embodiment of the present inventive concept, a MID rearranges data or responses from a slave IP, which are out of order; and transmits them to a master IP in the order in which requests are generated, thereby preventing deadlock and accomplishing stable load balancing.

While the present inventive concept has been particularly shown and described with reference to exemplary embodiments thereof, it will be understood by those of ordinary skill in the art that various changes in forms and details may be made therein without departing from the spirit and scope of the disclosure.

What is claimed is:

1. A memory interleaving device comprising:
a slave interface connected with a master intellectual property through an on-chip network;
a master interface connected with a slave intellectual property; and
a crossbar switch configured to connect the slave interface with the master interface,
wherein the memory interleaving device transmits requests from the master intellectual property to the slave intellectual property, receives data or responses respectively corresponding to the requests from the slave intellectual property, reorders the received data or responses to an order in which the corresponding requests were received, and transmits the reordered data or responses to the master intellectual property.

2. The memory interleaving device of claim 1, wherein the slave interface comprises:
an R channel block comprising a reorder buffer configured to store read data received from the slave intellectual property in response to a read memory request of the master intellectual property, a first selector configured to output the read data in order, and a first storage unit configured to store an ID and a direction of the read memory request; and
an AR channel block comprising an address decoder configured to decode an address of the read memory request and a second selector configured to transmit a decoded address to the slave intellectual property, and
wherein the master interface comprises: an AR channel block comprising a third selector configured to transmit the decoded address of the read memory request from the crossbar switch to the slave intellectual property; and an R channel block comprising a fourth selector configured to transmit the read data from the slave intellectual property to the slave interface.

3. The memory interleaving device of claim 1,
wherein the slave interface comprises:
an AW channel block comprising an address decoder configured to decode an address of a write memory request of the master intellectual property and a first selector configured to transmit a decoded address to the slave intellectual property;
a W channel block comprising a first Wdata-pathQ configured to receive direction information extracted by the address decoder and control information extracted from write data and a second selector configured to receive the write data and output the write data to the slave intellectual property in response to a control signal output from the first Wdata-pathQ; and
a B channel block comprising a reorder buffer configured to store a write response received from the slave intellectual property in response to the write memory request, a second storage unit configured to store an ID and a direction of the write memory request, and a third selector configured to output outputs of the reorder buffer in order, and
wherein the master interface comprises:
an AW channel block comprising a fourth selector configured to transmit the decoded address of the write memory request from the crossbar switch to the slave intellectual property;
a W channel block comprising a fifth selector configured to transmit the write data from the crossbar switch to the slave intellectual property in response to a control signal and a second Wdata-pathQ configured to remember an order in which the write memory request has been received and output the control signal based on the order; and
a B channel block comprising a sixth selector configured to transmit the write response from the slave intellectual property to the slave interface.

4. The memory interleaving device of claim 2, wherein the reorder buffer comprises as many slots as a read acceptance capability of an input channel.

5. The memory interleaving device of claim 3, wherein the reorder buffer comprises as many slots as a write acceptance capability of an input channel.

6. The memory interleaving device of claim 4, wherein each of the slots comprises a data buffer sized as a multiple of a predetermined maximum burst length.

7. The memory interleaving device of claim 5, wherein each of the slots comprises a buffer sized to store a BVALID field and a BRESP field.

8. The memory interleaving device of claim 4, wherein when the AR channel block of the slave interface receives the ID and the direction of the read memory request in the first storage unit, the reorder buffer allocates one slot among the slots and stores the ID and the direction and the read data transmitted from the R channel block of the master interface in the slot.

9. The memory interleaving device of claim 7, wherein when the AW channel block of the slave interface receives the ID and the direction of the write memory request in the second storage unit, the reorder buffer allocates one slot among the slots and stores the ID and the direction and the write response transmitted from the B channel block of the master interface in the slot.

10. The memory interleaving device of claim 8, wherein the allocated slot is linked to other slots having the same ID as the slot in a linked list in the order in which the read memory request is received.

11. The memory interleaving device of claim 9, wherein the allocated slot is linked to other slots having the same ID as the slot in a linked list in order in which the write memory request is received.

12. The memory interleaving device of claim 10, wherein the reorder buffer detects slots having the same ID and direction as the read memory request, stores read data in a data buffer of a slot that has an oldest read memory request among the detected slots, and detects a subsequent slot according to the linked list after the read data is completely stored in the data buffer.

13. The memory interleaving device of claim 11, wherein the reorder buffer detects slots having the same ID and direction as the write memory request, stores the write response in the BRESP field of a slot that has an oldest write memory request among the detected slots, and detects a subsequent slot according to the linked list after the write response is completely stored in the BRESP field.

14. The memory interleaving device of claim 12, wherein the reorder buffer subjects the slot having the oldest read memory request among slots, which have the same ID and read data, to arbitration to transmit the read data to the on-chip network.

15. A memory interleaving method comprising:
a master intellectual property transmitting a read memory request to a slave interface of a memory interleaving device through an on-chip network;
the slave interface decoding an address of the read memory request, outputting the decoded address to a master interface of the memory interleaving device that is connected with a slave intellectual property corresponding to the read memory request, and storing ID and direction information of the read memory request into a reorder buffer;
the reorder buffer allocating a slot for the ID and the direction information;
the master interface transmitting the decoded address to the slave intellectual property corresponding to the read memory request;
the slave intellectual property reading data corresponding to the read memory request and transmitting the data to the master interface;
the master interface transmitting the data to the slave interface that has transmitted the read memory request;
the reorder buffer storing the data received from the slave interface into the slot allocated for the ID and the direction information;
subjecting an oldest slot among slots of the reorder buffer having the same ID and direction information as the read memory request to arbitration after a data transaction is completed; and
the slave interface transmitting in order data subjected to the arbitration to the master intellectual property, which has transmitted the read memory request, through the on-chip network.

16. A memory interleaving device comprising:
a slave interface connected with a plurality of master intellectual properties IPs;
a master interface connected with a plurality of slave IPs; and
a crossbar switch configured to exchange data between the master IPs and the slave IPs,
wherein the memory interleaving device is configured to determine an order in which requests are received from the master IPs for slave IPs, transmit the requests to the corresponding slave IPs, receive corresponding messages from the slave IPs for each request in response to the transmitted requests, re-order the messages to correspond with the determined order, and output the re-ordered messages to the corresponding master IPs.

17. The memory interleaving device of claim 16, wherein the slave interface comprises:
a reorder buffer configured to store the re-ordered messages;
a first selector configured to sequentially output the re-ordered messages; an address decoder configured to decode addresses of the requests; and
a second selector configured to transmit the decoded addresses to the slave IPs.

18. The memory interleaving device of claim 17, wherein the master interface comprises:
a third selector configured to transmit the decoded addresses from the crossbar switch to the slave IPs; and
a fourth selector configured to transmit the messages to the slave interface.

19. The memory interleaving device of claim 16, wherein the slave interfaces comprises:
an address decoder configured to decode an address of a write memory request of the master intellectual property;
a first selector configured to transmit a decoded address to the slave intellectual property;
a first Wdata-pathQ configured to receive direction information extracted by the address decoder and control information extracted from write data;
a second selector configured to receive the write data and output the write data to the slave intellectual property in response to a control signal output from the first Wdata-pathQ;
a reorder buffer configured to store a write response received from the slave intellectual property in response to the write memory request;
a second storage unit configured to store an ID and a direction of the write memory request; and
a third selector configured to output outputs of the reorder buffer in order.

20. The memory interleaving device of claim 19, wherein the master interfaces comprises:
- a fourth selector configured to transmit the decoded address of the write memory request from the crossbar switch to the slave intellectual property;
- a fifth selector configured to transmit the write data from the crossbar switch to the slave intellectual property in response to a control signal;
- a second Wdata-pathQ configured to remember an order in which the write memory request has been received and output the control signal based on the order; and
- a sixth selector configured to transmit the write response from the slave intellectual property to the slave interface.

* * * * *